US 12,222,774 B2
Feb. 11, 2025

(12) United States Patent
Choi

(10) Patent No.: US 12,222,774 B2
(45) Date of Patent: Feb. 11, 2025

(54) ELECTRONIC DEVICE INCLUDING FLEXIBLE DISPLAY

(71) Applicant: Samsung Electronics Co., Ltd., Gyeonggi-do (KR)

(72) Inventor: Jonghwan Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 18/453,614

(22) Filed: Aug. 22, 2023

(65) Prior Publication Data

US 2023/0393634 A1    Dec. 7, 2023

Related U.S. Application Data

(63) Continuation of application No. 17/343,298, filed on Jun. 9, 2021, now Pat. No. 11,768,525.

(30) Foreign Application Priority Data

Jun. 10, 2020  (KR) .......................... 10-2020-0070114

(51) Int. Cl.
G06F 1/16 (2006.01)
(52) U.S. Cl.
CPC .......... *G06F 1/1681* (2013.01); *G06F 1/1616* (2013.01); *G06F 1/1652* (2013.01); *G06F 1/1656* (2013.01)
(58) Field of Classification Search
CPC .... G06F 1/1681; G06F 1/1616; G06F 1/1652; G06F 1/1656
See application file for complete search history.

(56) References Cited

U.S. PATENT DOCUMENTS

| 8,787,016 B2 | 7/2014 | Rothkopf et al. |
| 9,013,864 B2 | 4/2015 | Griffin et al. |

(Continued)

FOREIGN PATENT DOCUMENTS

| KR | 1020150142290 | 12/2015 |
| KR | 1020180032117 | 3/2018 |

(Continued)

OTHER PUBLICATIONS

International Search Report dated Sep. 30, 2021 issued in counterpart application No. PCT/KR2021/007278, 9 pages.

(Continued)

*Primary Examiner* — Abhishek M Rathod
(74) *Attorney, Agent, or Firm* — The Farrell Law Firm, P.C.

(57) ABSTRACT

A portable electronic device is provided having a foldable housing, a flexible display, and a hinge structure. The hinge structure includes a hinge cover, a rotary shaft assembly substantially accommodated in the hinge cover under the flexible display, and including a first rotary shaft and a second rotary shaft substantially parallel to each other. The hinge structure also includes a first arm structure and a second arm structure rotatably coupled with the first rotary shaft and the second rotary shaft, respectively. The hinge structure further includes a guide member connected with the rotary shaft assembly and including a recessed area located substantially between the first rotary shaft and the second rotary shaft when viewed from above the flexible display. The recessed area is configured to accommodate at least part of a third display portion when the foldable housing is at least partially folded.

17 Claims, 18 Drawing Sheets

(56) References Cited

U.S. PATENT DOCUMENTS

| | | |
|---|---|---|
| 9,483,081 B2 | 11/2016 | Lee et al. |
| 9,504,170 B2 | 11/2016 | Rothkopf et al. |
| 9,557,771 B2 | 1/2017 | Park et al. |
| 9,791,892 B2 | 10/2017 | Park et al. |
| 9,811,119 B2 | 11/2017 | Seo |
| 10,104,787 B2 | 10/2018 | Rothkopf et al. |
| 10,152,089 B2 | 12/2018 | Park et al. |
| 10,209,746 B2 | 2/2019 | Baek |
| 10,383,239 B2 | 8/2019 | Lee et al. |
| 10,491,725 B1* | 11/2019 | Harmon .............. H04M 1/0214 |
| 10,578,900 B2 | 3/2020 | Heo et al. |
| 10,585,458 B2 | 3/2020 | Park et al. |
| 10,601,967 B1 | 3/2020 | Harmon et al. |
| 10,694,624 B2 | 6/2020 | Rothkopf et al. |
| 10,701,193 B2 | 6/2020 | Harmon et al. |
| 10,845,850 B1* | 11/2020 | Kang .................... E05D 3/122 |
| 10,893,129 B2 | 1/2021 | Harmon et al. |
| 11,048,302 B2 | 6/2021 | Seo |
| 11,265,408 B2 | 3/2022 | Park |
| 11,379,005 B2 | 7/2022 | Xue |
| 2014/0126121 A1 | 5/2014 | Griffin et al. |
| 2014/0328041 A1 | 11/2014 | Rothkopf et al. |
| 2015/0366089 A1* | 12/2015 | Park .................... H04M 1/0268 361/679.01 |
| 2016/0070303 A1 | 3/2016 | Lee et al. |
| 2017/0285691 A1* | 10/2017 | Baek .................... G06F 1/1652 |
| 2018/0024593 A1 | 1/2018 | Seo |
| 2018/0032108 A1 | 2/2018 | Park et al. |
| 2018/0081233 A1 | 3/2018 | Heo et al. |
| 2018/0190936 A1* | 7/2018 | Lee .......................... B32B 3/30 |
| 2018/0242466 A1 | 8/2018 | Lee et al. |
| 2019/0166703 A1 | 5/2019 | Kim |
| 2019/0208649 A1 | 7/2019 | Jeon et al. |
| 2020/0166972 A1 | 5/2020 | Park et al. |
| 2020/0201385 A1 | 6/2020 | Choi |
| 2021/0011513 A1* | 1/2021 | Watamura ............ G06F 1/1652 |
| 2021/0034117 A1* | 2/2021 | Torres ................... G06F 1/1652 |
| 2021/0249625 A1* | 8/2021 | Kim ...................... G06F 1/1643 |
| 2021/0263563 A1* | 8/2021 | Tsuchihashi ......... G06F 1/1652 |
| 2021/0311525 A1 | 10/2021 | Seo |

FOREIGN PATENT DOCUMENTS

| | | |
|---|---|---|
| KR | 1020180097195 | 8/2018 |
| KR | 1020190077292 | 7/2019 |
| KR | 10-2019-0124110 | 11/2019 |
| KR | 10-2020-0031545 | 3/2020 |
| WO | WO 2015/190733 | 12/2015 |

OTHER PUBLICATIONS

European Search Report dated Oct. 2, 2023 issued in counterpart application No. 21822288.3-1224, 8 pages.

Korean Office Action dated Sep. 10, 2024 issued in counterpart application No. 10-2020-0070114, 24 pages.

* cited by examiner

ELECTRONIC DEVICE INCLUDING FLEXIBLE DISPLAY

CROSS-REFERENCE TO RELATED APPLICATION(S)

This application is a Continuation application of U.S. application Ser. No. 17/343,298, filed in the U.S. Patent and Trademark Office on Jun. 9, 2021, which is based on and claims priority under 35 U.S.C. § 119(a) to Korean Patent Application No. 10-2020-0070114, filed on Jun. 10, 2020, in the Korean Intellectual Property Office, the entire disclosures of which are incorporated herein by reference.

BACKGROUND

1. Field

The disclosure relates generally to an electronic device, and more particularly, to an electronic device including a flexible display.

2. Description of Related Art

A foldable electronic device including a flexible display has recently been developed in the display technology. The flexible display may include a folding area that is deformable into a flat or curved surface such that the flexible display is foldable. The folding area may be formed to be a curved surface in a folded state and a flat surface in an unfolded state. Accordingly, the foldable electronic device may provide portability in the folded state and may provide a display screen larger than that of a conventional bar type electronic device in the unfolded state.

The foldable electronic device including the flexible display may include a support plate disposed on a rear surface of a display panel. The support plate may be formed of a material having a predetermined level of stiffness to support the display panel and may rotate with a specified radius in a folding operation of the foldable electronic device. The foldable electronic device requires a space for ensuring a radius of rotation such that collision and interference between the support plate and other structures (e.g., a hinge structure) do not occur when the support plate rotates. Accordingly, an empty space may be formed under the display panel. However, this empty space tends to cause the display panel to be damaged and results in an increased thickness of the foldable electronic device.

Thus, there is a need in the art for a method and electronic device that provide an improved mechanism by which interference between the support plate and other structures in the electronic device is prevented, thereby decreasing the vulnerability to damage of the display panel and the thickness of the foldable electronic device.

SUMMARY

The disclosure is provided to address at least the above-mentioned problems and/or disadvantages and to provide at least the advantages described below.

Accordingly, an aspect of the disclosure is to provide an electronic device including a support plate, at least a partial area of which is variable.

In accordance with an aspect of the disclosure, a portable communication device is provided that includes a foldable housing including a first housing and a second housing each rotatable with respect to a first axis and a second axis. The portable communication device also includes a flexible display including a first display portion accommodated in the first housing, a second display portion accommodated in the second housing, and a third display portion between the first and second display portion and bendable according to the foldable housing being at least partially folded. The portable communication device further includes a hinge structure disposed and the flexible display and connected with each of the first housing and the second housing. The hinge structure includes a hinge cover, and a rotary shaft assembly substantially accommodated in the hinge cover under the flexible display, and including a first rotary shaft and a second rotary shaft substantially parallel to each other. The hinge structure also includes a first arm structure and a second arm structure rotatably coupled with the first rotary shaft and the second rotary shaft, respectively. The hinge structure further includes a guide member connected with the rotary shaft assembly and including a recessed area located substantially between the first rotary shaft and the second rotary shaft when viewed from above the flexible display. The recessed area is configured to accommodate at least part of the third display portion when the foldable housing is at least partially folded.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
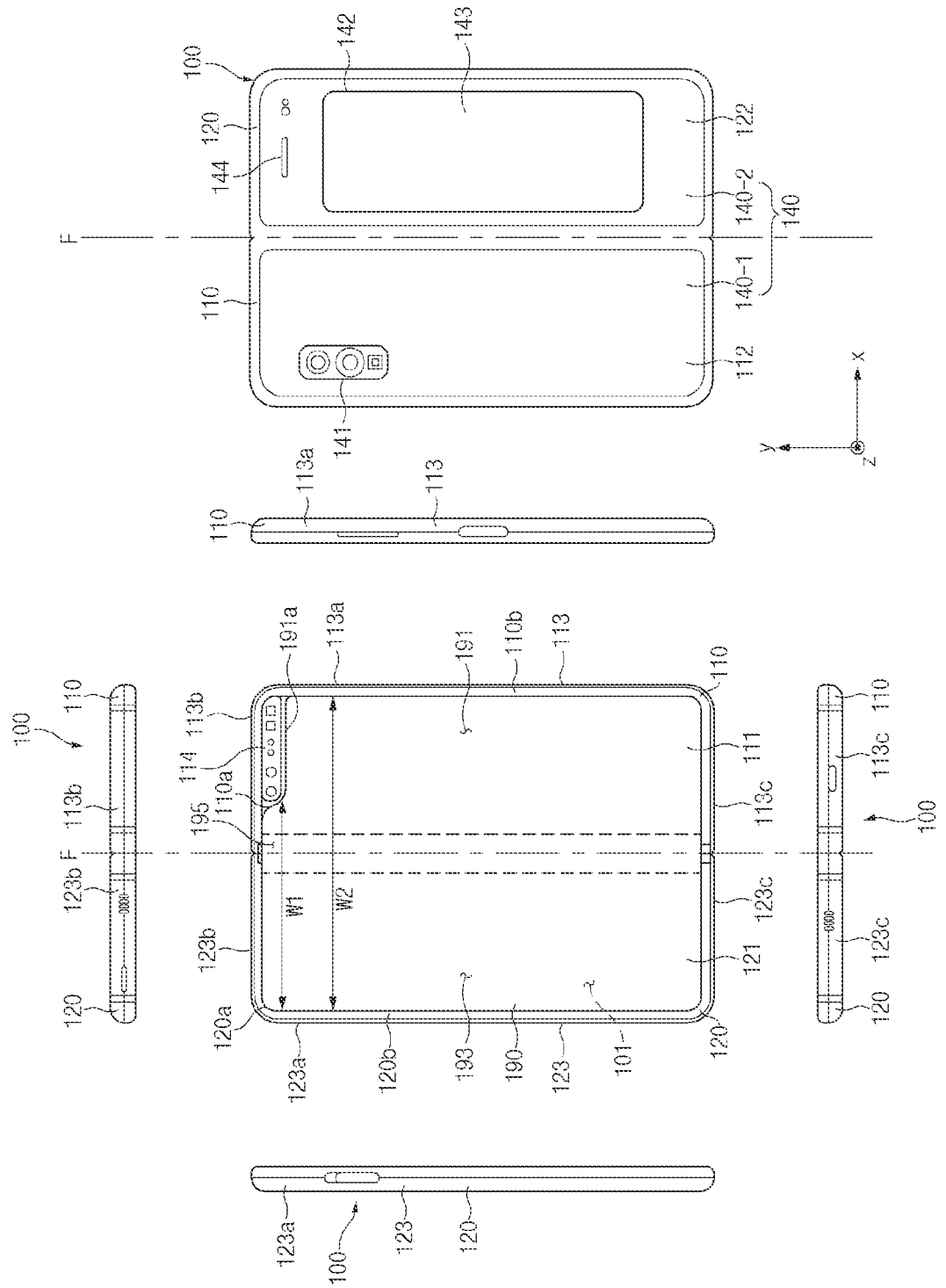
FIG. 1 illustrates an unfolded state of an electronic device according to an embodiment.

Hereinafter, embodiments of the disclosure may be described with reference to accompanying drawings. Accordingly, those of ordinary skill in the art will recognize that modification, equivalent, and/or alternative on the embodiments described herein can be variously made without departing from the scope and spirit of the disclosure. In the disclosure, identical or similar reference numerals may be used to refer to identical or similar components.

The electronic device may be one of various types of electronic devices including, for example, a portable communication device (e.g., a smartphone), a computer device, a portable multimedia device, a portable medical device, a camera, a wearable device, or a home appliance. However, the electronic devices are not limited to those described above.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another and do not limit the components in importance or order. It is to be understood that if a first element is referred to, with or without the term "operatively" or "communicatively", as "coupled with," "coupled to," "connected with," or "connected to" a second element, this indicates that the first element may be coupled with the second element directly or via a third element.

Figure 2:
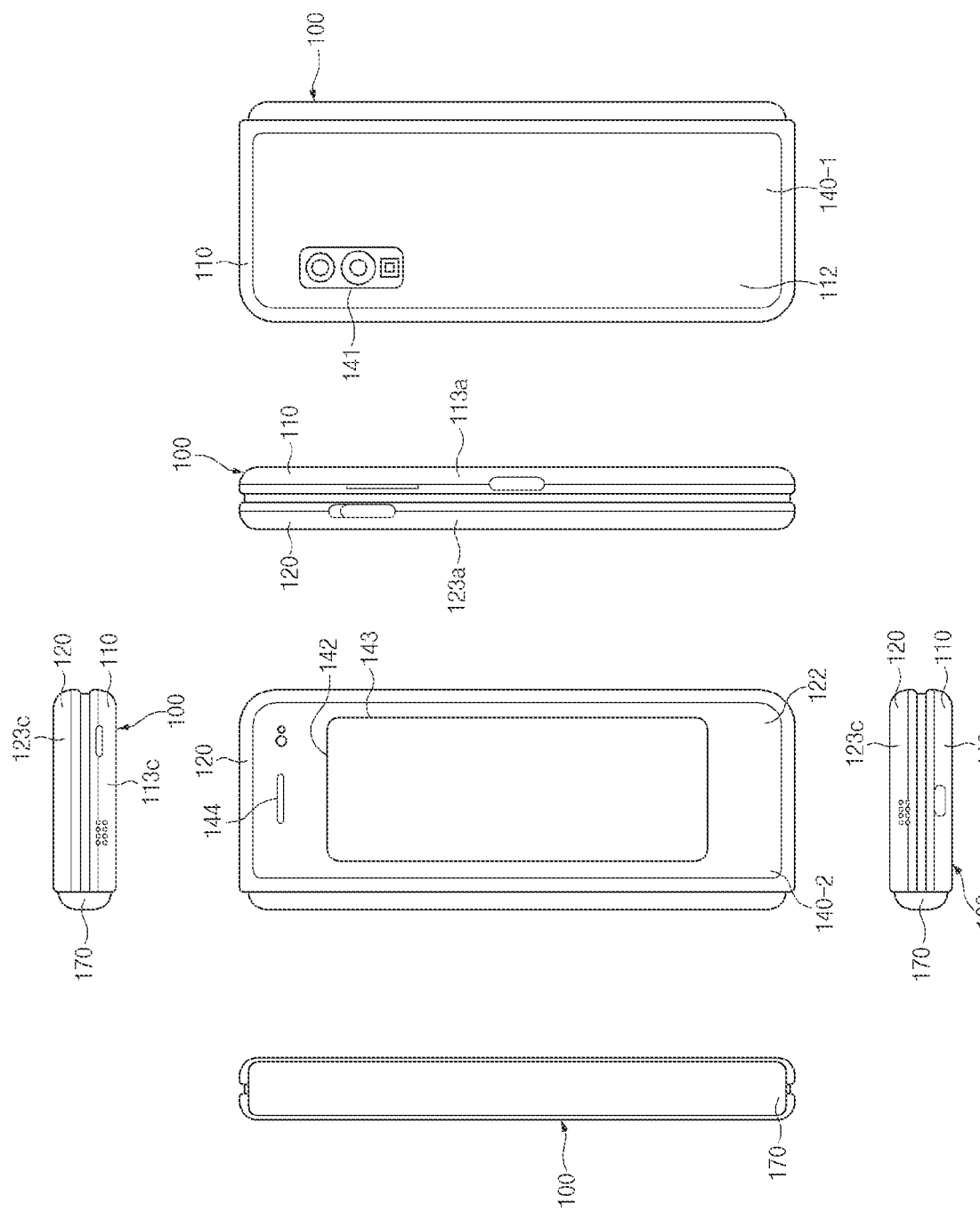
FIG. 2 illustrates a folded state of the electronic device according to an embodiment.

FIG. 1 illustrates an unfolded state of an electronic device according to an embodiment. FIG. 2 illustrates a folded state of the electronic device according to an embodiment.

Referring to FIGS. 1 and 2, the electronic device 100 may include a housing structure 110 and 120, a back cover 140, a hinge cover 170, and/or a display panel 190.

The electronic device 100 may be a foldable electronic device (e.g., a flexible display device) that can be changed to an unfolded state shown in FIG. 1 and a folded state shown in FIG. 2. The electronic device 100 may include the foldable housing structure 110 and 120 including a pair of housings coupled together so as to be folded or unfolded relative to each other, the hinge cover 170 that covers a foldable portion of the housing structure 110 and 120, and the flexible or foldable display panel 190 disposed in a space formed by the housing structure 110 and 120.

A surface on which the display panel 190 is disposed may be defined as a front surface of the electronic device 100, and a surface facing away from the front surface may be defined as a rear surface of the electronic device 100. Surfaces surrounding a space between the front surface and the rear surface may be defined as side surfaces of the electronic device 100.

The housing structure 110 and 120 may include the first housing 110 and the second housing 120.

The first housing 110 and the second housing 120 may be coupled to be rotatable relative to each other about a folding axis F. The first housing 110 and the second housing 120 may be disposed on opposite sides with respect to the folding axis F and may have substantially symmetric shapes with respect to the folding axis F. The angle or distance between the first housing 110 and the second housing 120 may vary depending on whether the electronic device 100 is in an unfolded state (or, an opened state), a folded state (or, a closed state), or an intermediate state. In another embodiment, the first housing 110 and the second housing 120 may have asymmetric shapes with respect to the folding axis F. For example, when the electronic device 100 is in a folded state, the first housing 110 and the second housing 120 may be folded in an asymmetric form about the folding axis F such that part of the display panel 190 is exposed outside the electronic device 100. Unlike the second housing 120, the first housing 110 may include a sensor area 114 in which various sensors are disposed. In another embodiment, a sensor area 114 may be disposed in at least a partial area of the second housing 120, in addition to or instead of the sensor area 114 of the first housing 110.

The first housing 110 may include a first surface 111 disposed to face toward the front surface of the electronic device 100 in the unfolded state of the electronic device 100, a second surface 112 facing away from the first surface 111, and a first side member 113 surrounding at least part of a space between the first surface 111 and the second surface 112. The first side member 113 may include a first side surface 113a disposed parallel to the folding axis F, a second side surface 113b extending from one end of the first side surface 113a in a direction perpendicular to the folding axis F, and a third side surface 113c extending from an opposite end of the first side surface 113a in the direction perpendicular to the folding axis F.

The second housing 120 may include a third surface 121 disposed to face toward the front surface of the electronic device 100 in the unfolded state of the electronic device 100, a fourth surface 122 facing away from the third surface 121, and a second side member 123 surrounding at least part of a space between the third surface 121 and the fourth surface 123. The second side member 123 may include a fourth side surface 123a disposed parallel to the folding axis F, a fifth side surface 123b extending from one end of the fourth side surface 123a in the direction perpendicular to the folding axis F, and a sixth side surface 123c extending from an opposite end of the fourth side surface 123a in the direction perpendicular to the folding axis F. The first surface 111 and the third surface 121 may face each other in the folded state of the electronic device 100 and may face the same direction in the unfolded state of the electronic device 100.

Through a structural coupling of the first housing 110 and the second housing 120, the electronic device 100 may form a display receiving portion 101 in which the flexible or foldable display panel 190 is received and/or disposed.

The display receiving portion 101 may have substantially the same shape or size as the display panel 190. The display receiving portion 101 may be formed over the first surface 111 of the first housing 110 and the third surface 121 of the second housing 120. Due to the sensor area 114, the display receiving portion 101 may have two or more different widths in the direction perpendicular to the folding axis F. For example, the display receiving portion 101 may have a first width W1 between a first portion 120a of the second housing 120 and a second portion 110a of the first housing 110 formed at an edge of the sensor area 114 and a second width W2 formed by a third portion 120b of the second housing 120 and a fourth portion 110b of the first housing 110 that does not correspond to the sensor area 114 and that is parallel to the folding axis F. In this case, the second width W2 may be greater than the first width W1.

The display receiving portion 101 may have the first width W1 between the second portion 110a of the first housing 110 and the first portion 120a of the second housing 120 that have mutually asymmetric shapes and the second width W2 between the fourth portion 110b of the first housing 110 and the third portion 120b of the second housing 120 that have mutually symmetric shapes. The second portion 110a and the fourth portion 110b of the first housing 110 may have different distances from the folding axis F. The width of the display receiving portion 101 is not limited to the illustrated embodiment and may have two or more different widths due to the form of the sensor area 114 or the asymmetric portions of the first housing 110 and the second housing 120.

At least part of the first housing 110 and at least part of the second housing 120 may be formed of a metallic material or a non-metallic material having a specified stiffness to support the display panel 190.

The sensor area 114 may be formed to have a predetermined area adjacent to one corner of the first housing 110. The sensor area 114 may be disposed beneath or inside the display panel 190 so as not to be exposed outside the electronic device 100. The arrangement, shape, or size of the sensor area 114 is not limited to the illustrated embodiment, such that the sensor area 114 may be provided in another corner of the first housing 110 or in any area between an upper corner and a lower corner of the first housing 110. The sensor area 114 may be disposed in at least a partial area of the second housing 120 or may extend from the first housing 110 to the second housing 120. Components for performing various functions may be exposed on the front surface of the electronic device 100 through the sensor area 114 or through one or more openings formed in the sensor area 114. For example, the components may include at least one of a front camera device, a receiver, a proximity sensor, an illuminance sensor, an iris recognition sensor, an ultrasonic sensor, or an indicator.

The back cover 140 may include a first back cover 140-1 and a second back cover 140-2. The first back cover 140-1 may be disposed on the second surface 112 of the first housing 110 and may have a substantially rectangular periphery. At least part of the periphery may be surrounded by the first housing 110. The second back cover 140-2 may be disposed on the fourth surface 122 of the second housing 120, and at least part of a periphery of the second back cover 140-2 may be surrounded by the second housing 120. As shown, the first back cover 140-1 and the second back cover 140-2 may have substantially symmetric shapes with respect to the folding axis F. However, without being limited to the illustrated embodiment, the first back cover 140-1 and the second back cover 140-2 may be formed in various shapes. The first back cover 140-1 may be integrally formed with the first housing 110, and the second back cover 140-2 may be integrally formed with the second housing 120.

The first housing 110, the second housing 120, the first back cover 140-1, and the second back cover 140-2 may provide, through a mutually coupled structure, a space in which various components (e.g., a printed circuit board, an antenna module, a sensor module, or a battery) of the electronic device 100 are disposed.

One or more components may be disposed, or visually exposed, on the rear surface of the electronic device 100. For example, one or more sensors may be visually exposed through a first rear area 141 of the first back cover 140-1. For example, the sensors may include a proximity sensor, a rear camera device, and/or a flash. At least part of a sub-display 143 may be visually exposed through a second rear area 142 of the second back cover 140-2. In addition, the electronic device 100 may include a speaker module 144 disposed through at least a partial area of the second back cover 140-2.

The display panel 190 may be disposed over the space formed by the housing structure 110 and 120. For example, the display panel 190 may be seated in the display receiving portion 101, which is formed by the housing structure 110 and 120, so as to be disposed on the first surface 111 of the first housing 110 and the third surface 121 of the second housing 120. The display panel 190 may be disposed to occupy substantially the entire front surface of the electronic device 100.

The display panel 190 may refer to a flexible display or a foldable display, at least part of which is deformable to be flat or curved. The display panel 190 may include a folding area 195, a first flat area 191 disposed on a right side of the folding area 195, and a second flat area 193 disposed on an opposite side, i.e., a left side of the folding area 195.

The first flat area 191 may be disposed on the first surface 111 of the first housing 110, and the second flat area 193 may be disposed on the third surface 121 of the second housing 120. The division of the display panel 190 into the areas is illustrative, and the display panel 190 may be divided into a plurality of areas of varying amounts depending on the structure or function of the display panel 190. Although it is shown that the display panel 190 is divided by the folding area 195 or the folding axis F that extends parallel to the Y-axis, the display panel 190 may be divided based on another folding area (e.g., a folding area parallel to the X-axis) or another folding axis (e.g., a folding axis parallel to the X-axis) in another embodiment. The above-described division of the display panel 190 into the areas merely corresponds to physical division by the first housing 110, the second housing 120, and a hinge structure 150 and the display panel 190 may be configured such that an entire screen is displayed by using the first housing 110, the second housing 120, and the hinge structure 150.

The first flat area 191 and the second flat area 193 may have shapes that are entirely symmetric to each other with respect to the folding area 195. However, unlike the second flat area 193, the first flat area 191 may include a notch area 191a that is cut depending on the presence of the sensor area 114. However, in the other area, the first flat area 191 may have a shape symmetric to that of the second flat area 193. For example, the first flat area 191 and the second flat area 193 may include mutually and asymmetric portions.

The hinge cover 170 may be disposed between the first housing 110 and the second housing 120 such that a hinge module 160 is not exposed to the outside. The hinge cover 170 may be hidden by part of the first housing 110 and part of the second housing 120 or may be exposed outside the housing structure 110 and 120, depending on an unfolded or a folded state of the electronic device 100.

For example, when the electronic device 100 is in an unfolded state, as in FIG. 1, the hinge cover 170 may be hidden by the first housing 110 and the second housing 120 and may not be exposed on the exterior of the electronic device 100. In another example, when the electronic device 100 is in a completely folded state, as in FIG. 2, the hinge cover 170 may be exposed outside the electronic device 100 from between the first housing 110 and the second housing 120. When the electronic device 100 is in an intermediate state in which the first housing 110 and the second housing 120 are folded with a certain angle, the hinge cover 170 may be at least partially exposed outside the electronic device 100 from between the first housing 110 and the second housing 120. The area by which the hinge cover 170 is exposed outside the electronic device 100 in the intermediate state may be smaller than the area exposed in the folded state shown in FIG. 2. The hinge cover 170 may at least partially include a curved surface.

Hereinafter, operations of the first housing 110 and the second housing 120 and states of the areas of the display panel 190 depending on an unfolded or a folded state of the electronic device 100 will be described.

When the electronic device 100 is in an unfolded state as in FIG. 1, the first housing 110 and the second housing 120 may form the same plane while forming an angle of 180 degrees. The first flat area 191 and the second flat area 193 of the display panel 190 may be disposed to face the same direction. The folding area 195 of the display panel 190 may form the same plane as the first flat area 191 and the second flat area 193. In the unfolded state, the first flat area 191, the second flat area 193, and the folding area 195 may form a screen display area while being exposed on the front surface of the electronic device 100.

When the electronic device 100 is in a folded state as in FIG. 2, the first housing 110 and the second housing 120 may be disposed to face each other. The first flat area 191 and the second flat area 193 of the display panel 190 may face each other while forming a narrow angle (e.g., between 0 degrees and 10 degrees). At least part of the folding area 195 may be formed to be a curved surface having a predetermined curvature. In the folded state, the first flat area 191, the second flat area 193, and the folding area 195 may not be exposed outside the electronic device 100.

When the electronic device 100 is in an intermediate state between the unfolded state and the folded state, the first housing 110 and the second housing 120 may be disposed at a certain angle. For example, the intermediate state may be before the first housing 110 and the second housing 120 are completely unfolded. The angle between the first flat area 191 and the second flat area 193 of the display panel 190 in the intermediate state may be greater than the angle in the folded state and may be less than the angle in the unfolded state. At least part of the folding area 195 may be formed to be a curved surface having a predetermined curvature, and the curvature may be smaller than that in the folded state and may be larger than that in the unfolded state.

As shown, the electronic device 100 may be an in-folding electronic device in which the display panel 190 is folded inward such that the display panel 190 is not exposed outside the electronic device 100 in a folded state. In another embodiment, the electronic device 100 may be an out-folding electronic device in which the display panel 190 is folded outward such that the display panel 190 is visually exposed outside the electronic device 100 in a folded state. In another embodiment, the electronic device 100 may be a multi-folding electronic device in which in-folding and out-folding are combined.

Figure 3A:
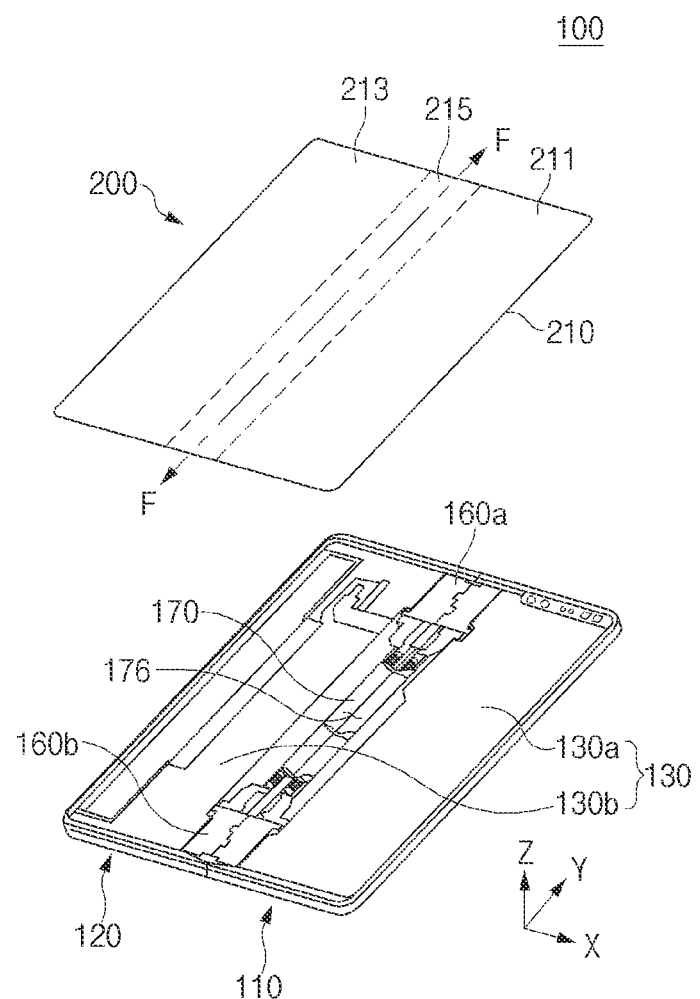
FIG. 3A is an exploded perspective view of the electronic device according to an embodiment.
Figure 3B:
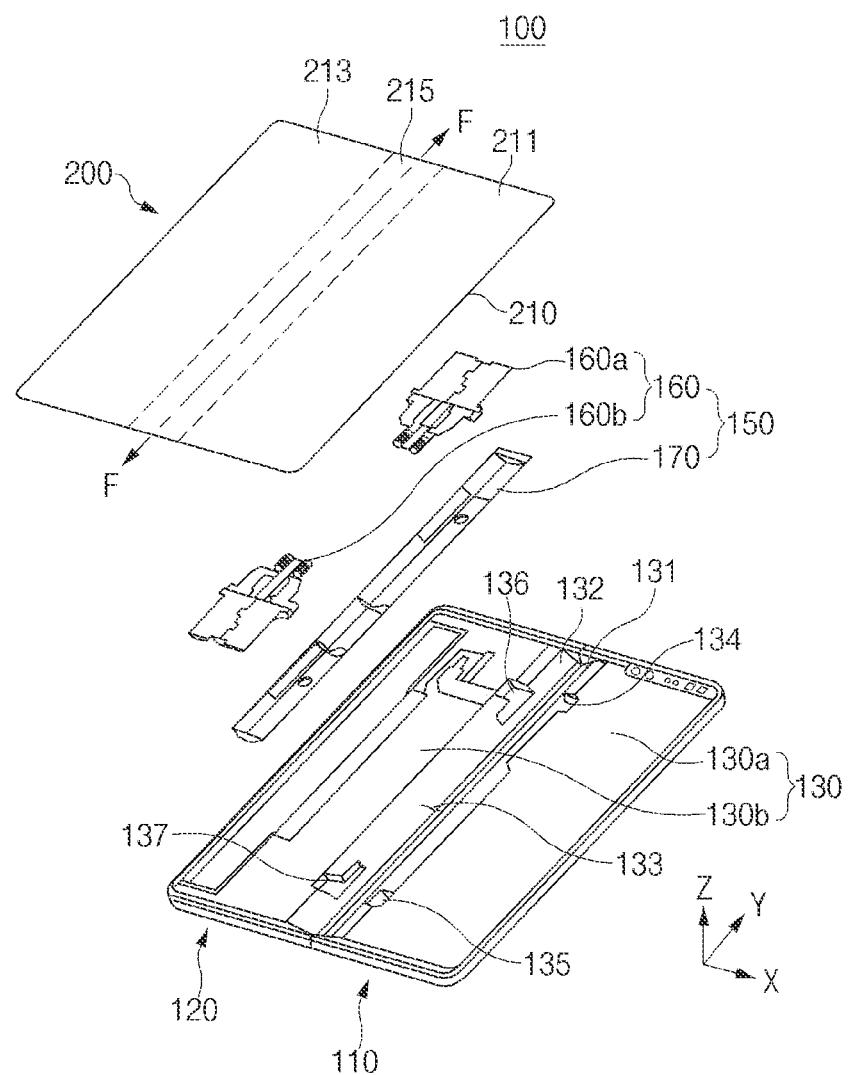
FIG. 3B is an exploded perspective view of the electronic device according to an embodiment.

FIG. 3A is an exploded perspective view of the electronic device according to an embodiment. FIG. 3B is an exploded perspective view of the electronic device according to an embodiment.

Referring to FIGS. 3A and 3B, the electronic device 100 may include the housing structure 110 and 120 including the first housing 110 and the second housing 120, the hinge structure 150 including the hinge module 160 and the hinge cover 170, and a display module 200 including a display panel 210.

The housing structure 110 and 120 may further include a support member 130. The first housing 110 may include a first side member 113 that surrounds at least part of the first housing 110. The second housing 120 may include a second side member 123 that surrounds at least part of the second housing 120. For example, a first support member 130a may partially face a first flat area 211 of the display panel 210, and a second support member 130b may partially face a second flat area 213 of the display panel 210.

The first support member 130a and the second support member 130b may be disposed on opposite sides of the hinge structure 150 and may be coupled with the hinge module 160 by using various fastening methods including screw-coupling. The first housing 110 and the second housing 120 may be configured to be rotatable by the hinge module 160 through the coupling of the hinge module 160 and the support members (e.g., the first support member 130a and the second support member 130b). The first support member 130a may be integrally formed with the first housing 110. The second support member 130b may be integrally formed with the second housing 120.

In the embodiment in FIG. 3B, the housing structure 110 and 120 may include, between the first support member 130a and the second support member 130b, a recess 133 in which at least part of the hinge cover 170 is disposed. The recess 133 may be formed such that at least part thereof has a predetermined curvature to correspond to the shape of the hinge cover 170. As shown in FIG. 3B, the recess 133 may be formed by a first support surface 131 of the first housing 110 and a second support surface 132 of the second housing 120 in an unfolded state of the electronic device 100. The first support surface 131 and the second support surface 132 may include a curved surface corresponding to the hinge cover 170. The first support surface 131 and the second support surface 132 may be formed substantially parallel to a folding axis F, and the curved surfaces of the first support surface 131 and the second support surface 132 may be formed to be inclined toward the rear surface of the electronic device 100.

When the electronic device 100 is in an unfolded state, the first support surface 131 and the second surface 132 may form the recess 133 to cover the hinge cover 170, thereby preventing the hinge cover 170 from being exposed on the rear surface of the electronic device 100 or reducing an exposed area of the hinge cover 170. In contrast, when the electronic device 100 is in a folded state, the first support surface 131 and the second support surface 132 may move along the curved surface of the hinge cover 170 to positions facing each other in the Z-axis direction and may expose the hinge cover 170 outside the electronic device 100.

The housing structure 110 and 120 may include steps 134, 135, 136, and 137 on which at least parts of the hinge structure 150 are seated. For example, the first housing 110 may include the first step 134 on which part (e.g., a first rotary bracket 161a of FIG. 8A) of a first hinge module 160a is seated and the second step 135 on which part (e.g., a second rotary bracket 161b of FIG. 8A) of a second hinge module 160b is seated. The second housing 120 may include the third step 136 on which part (e.g., the first rotary bracket 161a of FIG. 8A) of the first hinge module 160a is seated and the fourth step 137 on which part (e.g., the second rotary bracket 161b of FIG. 8A) of the second hinge module 160b is seated. The steps 134, 135, 136, and 137 may be formed adjacent to the recess 133 in which the hinge cover 170 is disposed.

Peripheral portions of the first housing 110 and the second housing 120 may be formed in higher positions than central portions thereof by a predetermined height. For example, the first side member 113 of the first housing 110 may further protrude upward beyond a bottom surface of the central portion of the first housing 110 (e.g., an upper surface of the first support member 130a) by a specified height to surround at least part of a periphery of the display panel 210. The peripheral portion (e.g., the second side member 123 of FIG. 1) of the second housing 120 may further protrude upward beyond a bottom surface of the central portion of the second housing 120 (e.g., an upper surface of the second support member 130b) by the specified height to surround at least part of the periphery of the display panel 210. Accordingly, a display receiving portion 101 in which the display panel 210 is received and seated may be formed in the housing structure 110 and 120.

The hinge structure 150 may include the hinge module 160 and the hinge cover 170.

The hinge module 160 and the hinge cover 170 may form the folding axis F and may connect the first housing 110 and the second housing 120 such that the first housing 110 and the second housing 120 are rotatable relative to each other. The hinge structure 150 may be disposed between the first housing 110 and the second housing 120 and may be coupled to the first housing 110 and the second housing 120. For example, a bracket structure (e.g., a bracket structure 161 of FIG. 8A) of the hinge module 160 may be coupled to the first housing 110 and the second housing 120, and accordingly the hinge structure 150 may be configured to connect the first housing 110 and the second housing 120.

The hinge module 160 may include the first hinge module 160a and the second hinge module 160b aligned with each other in a direction parallel to the folding axis F. Some components (e.g., at least part of an arm structure 162 and at least part of a detent structure 167 of FIG. 8A) of the hinge module 160 may be seated in an inner space of the hinge cover 170. For example, the inner space of the hinge cover 170 may refer to a predetermined space (e.g., a first space 174 or a second space 175 of FIG. 8B) that is provided in the hinge cover 170 formed in a concave form. Other components (e.g., at least part of the bracket structure 161 of FIG. 8A) of the hinge module 160 may be disposed over the hinge cover 170 or may be disposed so as not to overlap the hinge cover 170 with respect to the Z-axis direction. The bracket structure 161 of the hinge module 160 may correspond to a portion coupled with the first housing 110 and the second housing 120. At least part of the bracket structure 161 of the hinge module 160 may rotate together with the first housing 110 and the second housing 120 in response to rotary motions of the first housing 110 and the second housing 120.

At least part of the hinge module 160 may be coupled to the hinge cover 170. The first hinge module 160a and the second hinge module 160b may be disposed on opposite end portions (e.g., edge portions in the Y-axis direction) of the hinge cover 170. The first hinge module 160a and the second hinge module 160b may be fastened to at least parts of an inside surface of the hinge cover 170. For example, the hinge cover 170 may be formed in a concave shape in a direction toward the rear surface of the electronic device 100 (e.g., the −Z-axis direction) such that at least parts of the first hinge module 160a and the second hinge module 160b are received inside the hinge cover 170. Depending on a folded or an unfolded state of the electronic device 100, the hinge cover 170 may be hidden by the first housing 110 and the second housing 120 or may be exposed outside the electronic device 100.

As seen in FIG. 3A, the hinge structure 150 may include a recess 176 formed through a coupling of the first hinge module 160a, the second hinge module 160b, and the hinge cover 170. The recess 176 may refer to a predetermined space surrounded by the first hinge module 160a, the second hinge module 160b, and the hinge cover 170. For example, the recess 176 may refer to the remaining area of the hinge cover 170 where the first hinge module 160a and the second hinge module 160b are not disposed when the first hinge module 160a and the second hinge module 160b are coupled to the opposite end portions of the hinge cover 170.

The display module 200 may include the display panel 210 that is exposed on the front surface of the electronic device 100 in an unfolded state of the electronic device 100 and that forms a screen display area. Unlike the display panel 190 of FIGS. 1 and 2, the display panel 210 of FIGS. 3A and 3B may not include a notch area.

The display panel 210 may extend from one area of the first housing 110 to one area of the second housing 120 across the hinge structure 150. The display panel 210 may include the first flat area 211 disposed on the first housing 110, the second flat area 213 disposed on the second housing 120, and a folding area 215 that is disposed between the first flat area 211 and the second flat area 213 and that has flexible characteristics. The first flat area 211 may be attached to at least part of the first housing 110. The second flat area 213 may be attached to at least part of the second housing 120. The first flat area 211 and the second flat area 213 may rotate together with the first housing 110 and the second housing 120. The folding area 215 may not be attached to the first housing 110 and the second housing 120 such that the folding area 215 is deformable to be flat or curved depending on rotation of the first housing 110 and the second housing 120. The display panel 210 may at least partially have flexibility. For example, the folding area 215 may be formed of a flexible material, and the first flat area 211 and the second flat area 213 may be formed of a non-flexible material. The display panel 210 may be entirely formed of a flexible material and the display module 200 may include a digitizer panel that recognizes an input of a stylus pen.

Figure 4:
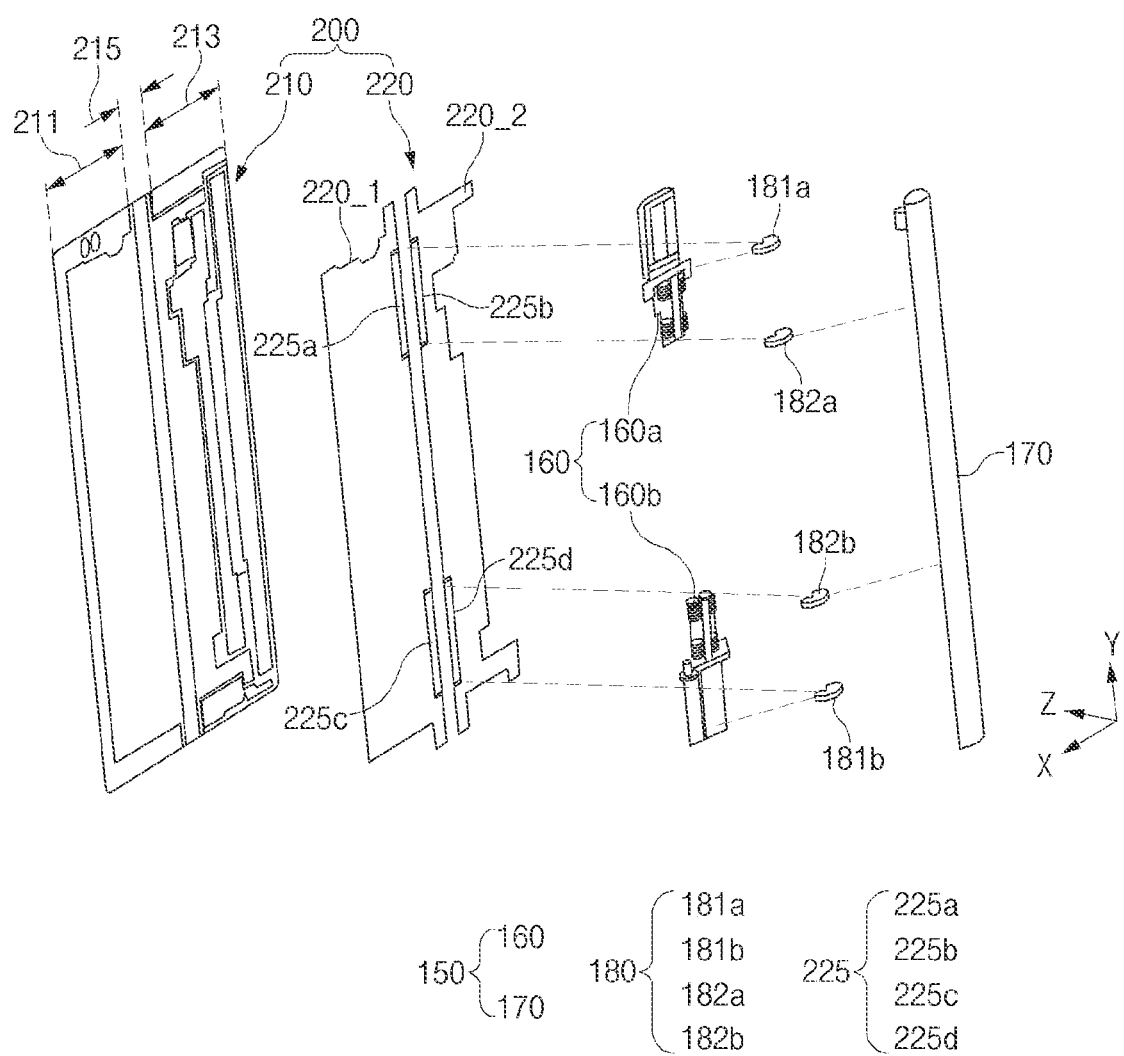
FIG. 4 is an exploded perspective view of a display module and a hinge structure of the electronic device according to an embodiment.

FIG. 4 is an exploded perspective view of the display module and the hinge structure of the electronic device according to an embodiment.

Referring to FIG. 4, the electronic device 100 may include the display module 200, guide members 180, and/or the hinge structure 150. The display module 200 may include the display panel 210 and/or a support plate 220. The hinge structure 150 may include the hinge module 160 and/or the hinge cover 170.

The support plate 220 for supporting the display panel 210 may be disposed on a rear surface (e.g., a surface facing the −Z-axis direction) of the display panel 210. The support plate 220 may be partially attached to the rear surface of the display panel 210 and may support the display panel 210 such that the display panel 210 is folded or unfolded depending on a folded and an unfolded state of the electronic device 100. When the folding area 215 is deformed from a curved surface to a flat surface as the display panel 210 is unfolded, the support plate 210 may support the display panel 210 such that the folding area 215 having flexible characteristics stably forms the flat surface. Accordingly, in the unfolded state of the electronic device 100, the folding area 215 of the display panel 210 may remain flat, and occurrence of flexure may be prevented.

The support plate 220 may be disposed between the first surface 111 and the third surface of the housing structure 110 and 120 and the rear surface of the display panel 210 and may be attached to the housing structure 110 and 120 and the display panel 210. The display panel 210 may be disposed on the housing structure 110 and 120 through the support plate 220.

The support plate 220 may include the first support plate 220_1 and a second support plate 220_2.

The first support plate 220_1 may support the first flat area 211 and at least part of the folding area 215 that is adjacent to the first flat area 211. The second support plate 220_2 may support the second flat area 213 and at least part of the folding area 215 that is adjacent to the second flat area 213. The first support plate 220_1 may be attached to the first flat area 211 of the display panel 210 and may support part of the folding area 215 and the first flat area 211. The first support plate 220_1 may be attached to at least a partial area of the first housing 110. The second support plate 220_2 may be attached to the second flat area 213 of the display panel 210 and may support at least a part other than the part supported by the first support plate 220_1 of the folding area 215 and the second flat area 213. The second support plate 220_2 may be attached to at least a partial area of the second housing 120. The first support plate 220_1 and the second support plate 220_2 may be attached to the first flat area 211 and the second flat area 213, respectively, by being spaced apart from each other in the −X/X-axis direction perpendicular to the folding axis F.

The first support plate 220_1 and the second support plate 220_2 may be asymmetric with each other with respect to the folding axis F. However, the shapes of the first support plate 220_1 and the second support plate 220_2 are not limited to the illustrated embodiment and may be modified according to design needs. For example, the first support plate 220_1 and the second support plate 220_2 may be formed in shapes substantially or partially symmetric to each other with respect to the folding axis F.

To stably support the display panel 210, the first support plate 220_1 and the second support plate 220_2 may be at least partially formed of a material having a specified stiffness. The support plate 220 may be formed of one material having the same stiffness or of a plurality of materials. For example, one area of the support plate 220 may be formed of a material different from that of another area to have a different stiffness from the other area. In another example, considering thermal characteristics, light weight, or implementation of different operations, the support plate 220 may be formed of one or more materials to partially have non-uniform characteristics.

The support plate 220 may include bending portions 225 in at least parts thereof. The bending portions 225 may refer to regions in partial areas (e.g., extending areas 223 and 224 of FIG. 5A) of the support plate 220 that are deformable as the display panel 210 is folded or unfolded. The bending portions 225 may be formed to be subjected to bending deformation as at least parts of the bending portions 225 are bent.

The bending portions 225 may be formed in the first support plate 220_1 and the second support plate 220_2. The bending portions 225 may include a first bending portion 225a formed in the first support plate 220_1 and a second bending portion 225b formed in the second support plate 220_2. The first bending portion 225a and the second bending portion 225b may be disposed to face each other in the −X/X-axis direction. Additionally, the bending portions 225 may further include a third bending portion 225c formed in the first support plate 220_1 and spaced apart from the first bending portion 225a and a fourth bending portion 225d formed in the second support plate 220_2 and spaced apart from the second bending portion 225b. The third bending portion 225c and the fourth bending portion 225d may be disposed to face each other in the −X/X-axis direction. The positions, shapes, or number of bending portions 225 are not limited to the illustrated embodiment and may be modified.

The guide members 180 for guiding bending deformation of the bending portions 225 may be located on at least one of the hinge module 160 or the hinge cover 170. Alternatively, the guide members 180 may be integrally formed with the hinge module 160 and/or the hinge cover 170.

The guide members 180 may be disposed to face at least parts of the bending portions 225. The guide members 180 may be brought into contact with at least parts of the bending portions 225. The guide members 180 may guide deformation of the bending portions 225 by being brought into contact with, or spaced apart from, at least parts of the bending portions 225 depending on a folded or an unfolded state of the electronic device 100. In another example, depending on operational states of the electronic device 100, the angles and/or areas at which the guide members 180 contact the bending portions 225 may be changed, and accordingly the guide members 180 may guide deformation of the bending portions 225. Deformation of the bending portions 225 by the guide members 180 will be described below in more detail with reference to FIGS. 9 to 12B.

The guide members 180 may include a plurality of guide members 180 to correspond to the bending portions 225. The guide members 180 may include a first guide member 181a disposed on the first hinge module 160a, a second guide member 181b disposed on the second hinge module 160b, a third guide member 182a disposed on the hinge cover 170 so as to be spaced apart from the first guide member 181a in the −Y-axis direction, and a fourth guide member 182b disposed on the hinge cover 170 so as to be spaced apart from the second guide member 181b in the +Y-axis direction. The first guide member 181a, the second guide member 181b, the third guide member 182a, and the fourth guide member 182b may be arranged in a direction substantially parallel to the folding axis F.

The first guide member 181a and the third guide member 182a may guide deformation (e.g., bending) of the first bending portion 225a and the second bending portion 225b. The first guide member 181a and the third guide member 182a may be disposed to face at least part of the first bending portion 225a and at least part of the second bending portion 225b in the Z-axis direction. The second guide member 181b and the fourth guide member 182b may guide deformation of the third bending portion 225c and the fourth bending portion 225d. The second guide member 181b and the fourth guide member 182b may be disposed to face at least part of the third bending portion 225c and at least part of the fourth bending portion 225d in the Z-axis direction.

The first guide member 181a and the third guide member 182a may face opposite end portions of each of the first bending portion 225a and the second bending portion 225b. The first guide member 181a may be disposed adjacent to an end portion facing the +Y-axis direction of the first bending portion 225a and an end portion facing the +Y-axis direction of the second bending portion 225b. The third guide member 182a may be disposed adjacent to an opposite end portion (e.g., an end portion facing the −Y-axis direction) of the first bending portion 225a and an opposite end portion (e.g., an end portion facing the −Y-axis direction) of the second bending portion 225b. Similarly, the second guide member 181b and the fourth guide member 182b may face opposite end portions of each of the third bending portion 225c and the fourth bending portion 225d. The second guide member 181b may be disposed adjacent to an end portion facing the −Y-axis direction of the third bending portion 225c and an end portion facing the −Y-axis direction of the fourth bending portion 225d. The fourth guide member 182b may be disposed adjacent to an opposite end portion (e.g., an end portion facing the +Y-axis direction) of the third bending portion 225c and an opposite end portion (e.g., an end portion facing the +Y-axis direction) of the fourth bending portion 225d.

As shown, the support plate 220 may include two pairs of bending portions, i.e., the first bending portion 225a and the second bending portion 225b, and the third bending portion 225c and the fourth bending portion 225d that are spaced apart from each other.

The guide members 180 may include two pairs of guide members, i.e., the first guide member 181a and the third guide member 182a, and the second guide member 181b and the fourth guide member 182b to correspond to the two pairs of bending portions. However, the bending portions 225 and the guide members 180 are not limited thereto, and depending on the positions, number, or lengths of bending portions, guide members may be added or omitted. For example, the guide members 180 may further include a pair of guide members disposed between the third guide member 182a and the fourth guide member 182b when a pair of bending portions is added between the first bending portion 225a and the third bending portion 225c and between the second bending portion 225b and the fourth bending portion 225d.

Figure 5A:
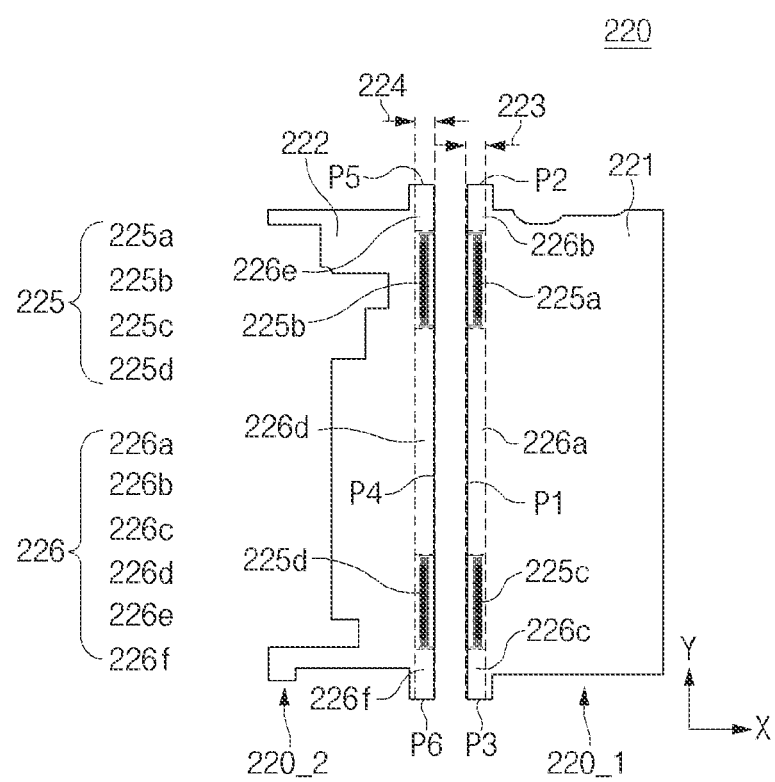
FIG. 5A is a plan view of a support plate of the electronic device according to a first embodiment.
Figure 5B:
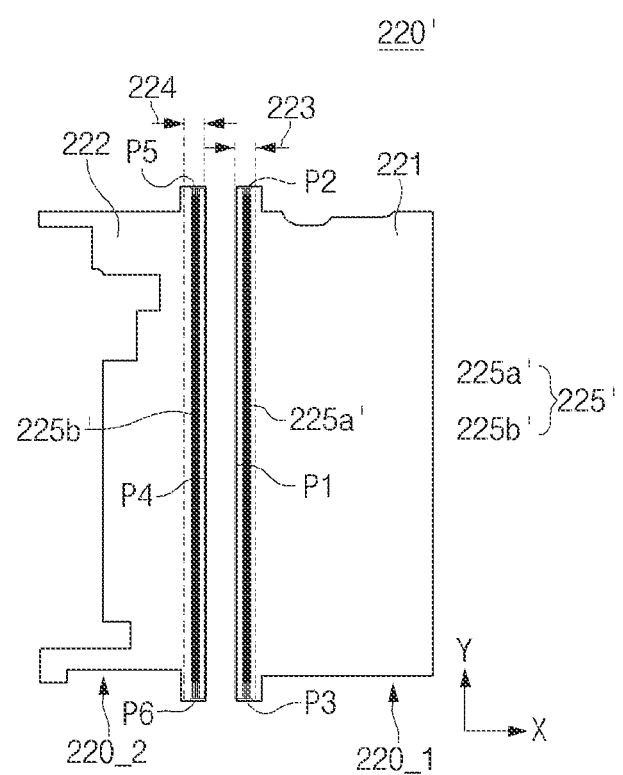
FIG. 5B is a plan view of a support plate of the electronic device according to a second embodiment.

FIG. 5A is a plan view of a support plate of the electronic device according to a first embodiment. FIG. 5B is a plan view of a support plate of the electronic device according to a second embodiment.

Referring to FIGS. 5A and 5B, the support plates 220 and 220' may each include the first support plate 220_1 and the second support plate 220_2 disposed to face each other. As described above, the first support plate 220_1 may be disposed between the first flat area 211 of the display panel 210 and the first housing 110, and the second support plate 220_2 may be disposed between the second flat area 213 of the display panel 210 and the second housing 120.

Referring to the first embodiment in FIG. 5A, the first support plate 220_1 and the second support plate 220_2 of the support plate 220 may include attachment areas 221 and 222 attached to at least parts of the display panel 210 and the extending areas 223 and 224 extending from the attachment areas 221 and 222 in one direction. The extending areas 223 and 224 may be configured so as not to be at least partially attached to the display panel 210. The extending areas 223 and 224 may include the bending portions 225 formed in at least parts of the extending areas 223 and 224 and non-deformable portions 226 formed in parts of the extending areas 223 and 224 other than the bending portions 225. Unlike the bending portions 225, the non-deformable portions 226 are fixed and/or maintained without being deformed irrespective of operational states of the electronic device 100.

The first support plate 220_1 may include the first attachment area 221 and the first extending area 223. The first extending area 223 may include the first bending portion 225a, the third bending portion 225c, and non-deformable portions 226a, 226b, and 226c. The first bending portion 225a and the third bending portion 225c may be formed in partial areas of the first extending area 223. The non-deformable portions 226a, 226b, and 226c may be formed in the remaining areas where the first bending portion 225a and the third bending portion 225c are not formed in the first extending area 223. For example, the non-deformable portions 226a, 226b, and 226c do not overlap the first bending portion 225a and the third bending portion 225c in the first extending area 223.

The first bending portion 225a and the third bending portion 225c may be spaced apart from a second edge P2 and a third edge P3 of the first extending area 223. The first bending portion 225a and the third bending portion 225c may be spaced apart from each other in the −Y/Y-axis direction parallel to the folding axis F. The first extending area 223 may include a first edge P1 extending in the vertical −Y/Y-axis direction and the second edge P2 and the third edge P3 that extend from opposite ends of the first edge P1 in the +X-axis direction perpendicular to the first edge P1. The first bending portion 225a may be spaced apart from the second edge P2 by a specified distance in the −Y-axis direction. The third bending portion 225c may be spaced apart from the third edge P3 by a specified distance in the +Y-axis direction. The third bending portion 225c may be spaced apart from the first bending portion 225a by a specified distance in the −Y-axis direction.

The non-deformable portions 226a, 226b, and 226c may include the first non-deformable portion 226a between the first bending portion 225a and the third bending portion 225c, the second non-deformable portion 226b between the second edge P2 and the first bending portion 225a, and the third non-deformable portion 226c between the third edge P3 and the third bending portion 225c.

The second support plate 220_2 may include the second attachment area 222 and the second extending area 224. The second extending area 224 may include the second bending portion 225b, the fourth bending portion 225d, and non-deformable portions 226d, 226e, and 226f. The second bending portion 225b and the fourth bending portion 225d may be formed in partial areas of the second extending area 224 to correspond to the first bending portion 225a and the third bending portion 225c. The non-deformable portions 226d, 226e, and 226f may be formed in the remaining areas where the second bending portion 225b and the fourth bending portion 225d are not formed in the second extending area 224. For example, the non-deformable portions 226d, 226e, and 226f do not overlap the second bending portion 225b and the fourth bending portion 225d in the second extending area 224.

The second bending portion 225b and the fourth bending portion 225d may be spaced apart from a fifth edge P5 and a sixth edge P6 of the second extending area 224. The second bending portion 225b and the fourth bending portion 225d may be spaced apart from each other in the −Y/Y-axis direction parallel to the folding axis F. The second extending area 224 may include a fourth edge P4 extending in the −Y/Y-axis direction and the fifth edge P5 and the sixth edge P6 that extend from opposite ends of the fourth edge P4 in the −X-axis direction perpendicular to the fourth edge P4. The second bending portion 225b may be spaced apart from the fifth edge P5 by a specified distance in the −Y-axis direction. The fourth bending portion 225d may be spaced apart from the sixth edge P6 by a specified distance in the +Y-axis direction and may be spaced apart from the second bending portion 225b by a specified distance in the −Y-axis direction.

The non-deformable portions 226d, 226e, and 226f may include the fourth non-deformable portion 226d between the second bending portion 225b and the fourth bending portion 225d, the fifth non-deformable portion 226e between the fifth edge P5 and the second bending portion 225b, and the sixth non-deformable portion 226f between the sixth edge P6 and the fourth bending portion 225d.

Referring to the second embodiment in FIG. 5B, the support plate 220' does not include the non-deformable portions 226 in the extending areas 223 and 224, unlike the support plate 220 illustrated in the first embodiment in FIG. 5A.

The entire first extending area 223 and the entire second extending area 224 of the support plate 220' may be formed of bending portions 225' and do not include the non-deformable portions 226. The first extending area 223 may include a first bending portion 225a' extending in the −Y/Y-axis direction over the entire first extending area 223 and the second extending area 224 may include a second bending portion 225b' extending in the −Y/Y-axis direction over the entire second extending area 224.

The numbers and positions of bending portions 225 and 225' are not limited to those illustrated and may be modified. For example, in the support plate 220 illustrated in FIG. 5A, a plurality of bending portions may be additionally disposed between the first bending portion 225a and the third bending portion 225c and between the second bending portion 225b and the fourth bending portion 225d. Alternatively, the first bending portion 225a and the third bending portion 225c may be connected to the second edge P2 and the third edge P3, respectively, and the second bending portion 225b and the fourth bending portion 225d may be connected to the fifth edge P5 and the sixth edge P6, respectively.

In another example, in the support plate 220' illustrated in FIG. 5B, the first bending portion 225a' may be spaced apart from the second edge P2 at a predetermined interval, and the second bending portion 225b' may be spaced apart from the fifth edge P5 at a predetermined interval. Alternatively, the first bending portion 225a' may be spaced apart from the third edge P3 at a predetermined interval, and the second bending portion 225b' may be spaced apart from the sixth edge P6 at a predetermined interval.

The bending portions 225 and 225' may include a lattice pattern or a slit pattern such that at least parts of the bending portions 225 and 225' are bendable. Alternatively, at least parts of the bending portions 225 and 225' may be formed of a flexible material (e.g., a polymer material, rubber, or a leather material). The shapes of the bending portions 225 and 225' will be described below in detail with reference to FIGS. 7A, 7B and 7C.

According to the support plate 220 illustrated in FIG. 5A, the first edge P1 of the first extending area 223 may face the fourth edge P4 of the second extending area 224. The first edge P1 may include first sections corresponding to the first bending portion 225a and the third bending portion 225c, a second section corresponding to the first non-deformable portion 226a, and third sections corresponding to the second non-deformable portion 226b and the third non-deformable portion 226c. The fourth edge P4 may include fourth sections corresponding to the second bending portion 225b and the fourth bending portion 225d, a fifth section corresponding to the fourth non-deformable portion 226d, and sixth sections corresponding to the fifth non-deformable portion 226e and the sixth non-deformable portion 226f. The first sections of the first support plate 220_1 may face the fourth sections of the second support plate 220_2. The second section of the first support plate 220_1 may face the fifth section of the second support plate 220_2. The third sections of the first support plate 220_1 may face the sixth sections of the second support plate 220_2.

Figure 6:
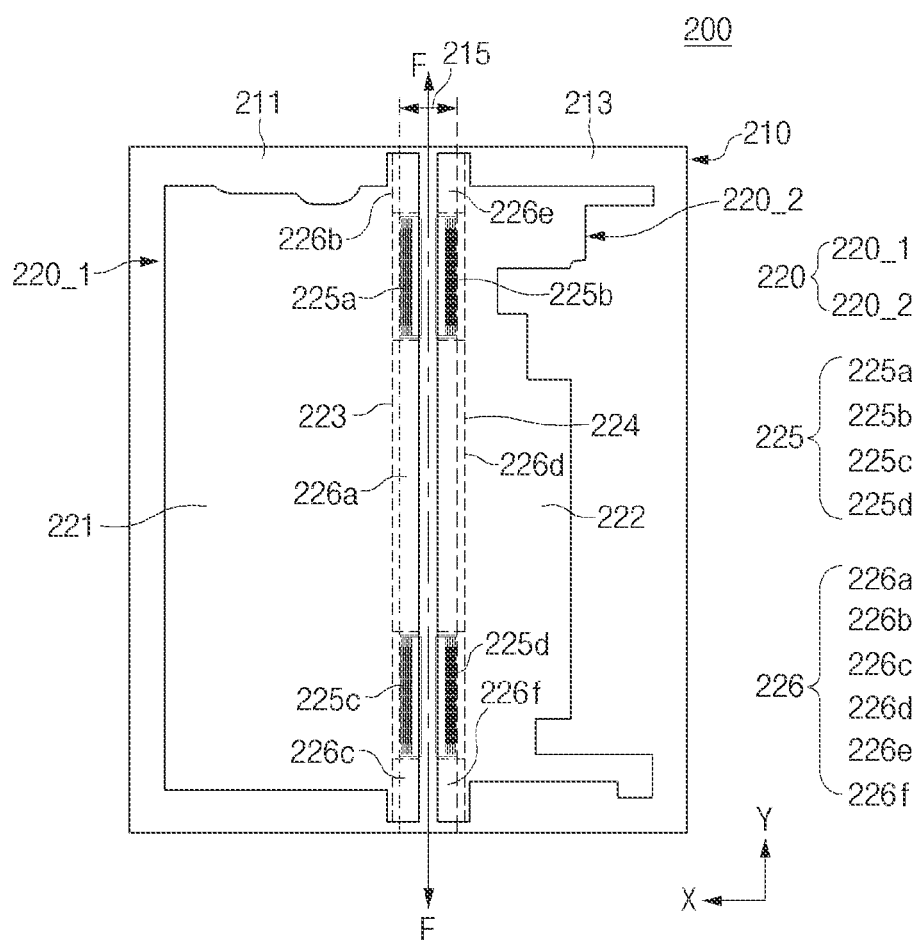
FIG. 6 is a plan view of the display module of the electronic device according to an embodiment.

FIG. 6 is a plan view of the display module of the electronic device as viewed from the rear according to an embodiment.

Referring to FIG. 6, the display module 200 may include the display panel 210 including the first flat area 211, the second flat area 213, and the folding area 215 and the support plate 220 including the first support plate 220_1 and the second support plate 220_2. The first support plate 220_1 may include the first attachment area 221 and the first extending area 223, and the second support plate 220_2 may include the second attachment area 222 and the second extending area 224.

Hereinafter, positions between the first flat area 211, the second flat area 213, and the folding area 215 of the display panel 210 and the first attachment area 221, the first extending area 223, the second attachment area 222, and the second extending area 224 of the support plate 220 when the display panel 210 and the support plate 220 are attached to each other will be described.

The first attachment area 221 of the first support plate 220_1 may be attached to at least part of the first flat area 211 of the display panel 210. The first extending area 223 may extend from the first attachment area 221 in the −X-axis direction to at least partially face the folding area 215. When the rear surface (e.g., the surface facing the −Z-axis direction) of the display panel 210 is viewed, at least part of the first extending area 223 may overlap the folding area 215. Accordingly, the first bending portion 225a and the third bending portion 225c and the first non-deformable portion 226a, the second non-deformable portion 226b, and the third non-deformable portion 226c may be disposed to at least partially face the folding area 215. The first extending area 223 may not be at least partially attached to the display panel 210. For example, the folding area 215 may not be attached to the first support plate 220_1 so as to be bendable.

The second attachment area 222 of the second support plate 220_2 may be attached to at least part of the second flat area 213 of the display panel 210. The second extending area 224 may extend from the second attachment area 222 in the +X-axis direction to at least partially face the folding area 215. When the rear surface facing the −Z-axis direction of the display panel 210 is viewed, at least part of the second extending area 224 may overlap the folding area 215. Accordingly, the second bending portion 225b and the fourth bending portion 225d and the fourth non-deformable portion 226d, the fifth non-deformable portion 226e, and the sixth non-deformable portion 226f may be disposed to at least partially face the folding area 215. The second extending area 224 may not be at least partially attached to the display panel 210. The folding area 215 may not be attached to the second support plate 220_2 so as to be bendable.

The extending areas 223 and 224 may not be at least partially attached to the display panel 210 and therefore may be brought into contact with, or spaced apart from, at least part of the folding area 215 depending on a folded or an unfolded state of the electronic device 100. In an unfolded state of the electronic device 100, the first extending area 223 and the second extending area 224 may contact the folding area 215 to support at least part of the folding area 215, thereby allowing the folding area 215 to remain flat. In a folded state of the electronic device 100, the first extending area 223 and the second extending area 224 may be spaced apart from the folding area 215 and may extend in the direction of tangential surfaces to a curved surface formed by the folding area 215, thereby enabling the folding area 215 to be bent.

When the extending areas 223 and 224 are brought into contact with, or spaced apart from, the folding area 215, the bending portions 225 may be deformed in a specified shape, and the non-deformable portions 226 may remain substantially flat. For example, when the electronic device 100 is changed from an unfolded state to a folded state, the non-deformable portions 226 may remain flat, and the bending portions 225 may be at least partially bent (e.g., refer to FIGS. 9 to 12B).

The first extending area 223 may overlap part of the first flat area 211 and part of the folding area 215. The second extending area 224 may overlap part of the second flat area 213 and part of the folding area 215. Accordingly, the area overlapping the first extending area 223 of the first flat area 211 and the area overlapping the second extending area 224 of the second flat area 213 may not be attached to the support plate 220. However, the disclosure is not limited thereto, and the extending areas 223 and 224 may be formed so as not to overlap the flat areas 211 and 213. For example, because the display panel 210 is foldable if only the folding area 215 is not attached to the support plate 220, the extending areas 223 and 224 may be formed to overlap only the folding area 215 by corresponding to borders between the folding area 215 and the flat areas 211 and 213.

The display module 200 in FIG. 6 may include the support plate 220 illustrated in FIG. 5A or the support plate 220' illustrated in FIG. 5B.

Figure 7A:
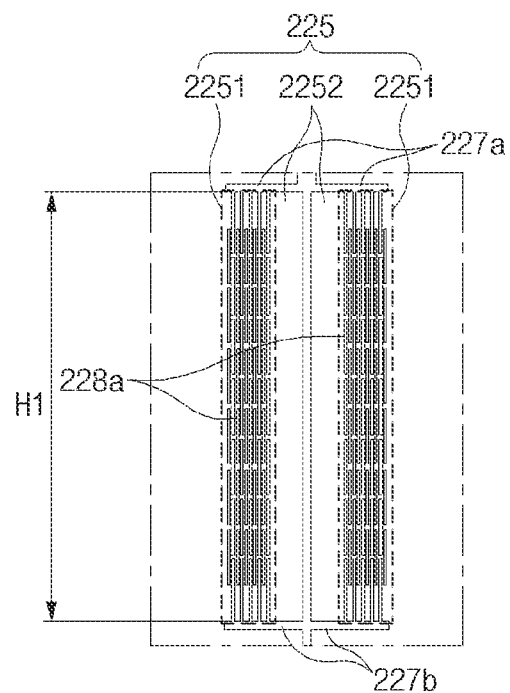
FIG. 7A illustrates a bending portion of a support plate of the electronic device according to a first embodiment.
Figure 7B:
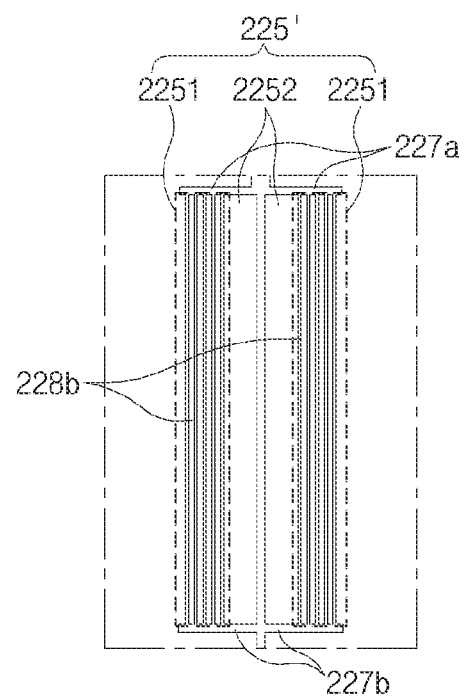
FIG. 7B illustrates a bending portion of a support plate of the electronic device according to a second embodiment.
Figure 7C:
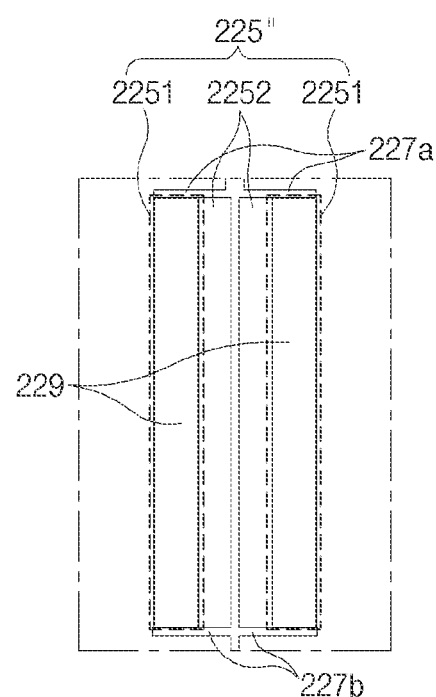
FIG. 7C illustrates a bending portion of a support plate of the electronic device according to a third embodiment.

FIG. 7A illustrates a bending portion of the support plate of the electronic device according to a first embodiment. FIG. 7B illustrates a bending portion of the support plate of the electronic device according to a second embodiment. FIG. 7C illustrates a bending portion of the support plate of the electronic device according to a third embodiment.

Referring to FIGS. 7A, 7B and 7C, the bending portions 225, 225', and 225" may each include first areas 2251 that are deformable and second areas 2252 that are non-deformable. Hereinafter, the bending portions 225, 225', and 225" may include a first bending portion 225a, a second bending portion 225b, a third bending portion 225c, and/or a fourth bending portion 225d.

The first areas 2251 may include a plurality of slits 228a or 228b or a flexible material 229 such that at least parts of the bending portions 225, 225', and 225" are bendable. For example, the first areas 2251 may be slit areas or flexible areas. The second areas 2252 may refer to the remaining areas of the bending portions 225, 225', and 225" other than the first areas 2251. Unlike the first areas 2251 that are variable areas, the second areas 2252 may maintain stiffness even when at least parts of the bending portions 225, 225', and 225" are bent. For example, the first areas 2251 may be variable areas, and the second areas 2252 may be invariable areas.

The bending portion 225 may be formed by cutting away at least part of the support plate 220 such that the bending portion 225 is bendable or unbendable with respect to the attachment areas 221 and 222 and the non-deformable portions 226 of the support plate 220 other than the bending portion 225. The support plate 220 may be formed such that cut-away areas 227a and 227b are located at opposite ends of the bending portion 225 in a lengthwise direction. The cut-away areas 227a and 227b may be formed in a direction perpendicular to the lengthwise folding axis F direction of the bending portion 225. For example, the first cut-away area 227a may be located at an upper end of the bending portion 225, and the second cut-away area 227b may be located at a lower end of the bending portion 225.

Figure 9:
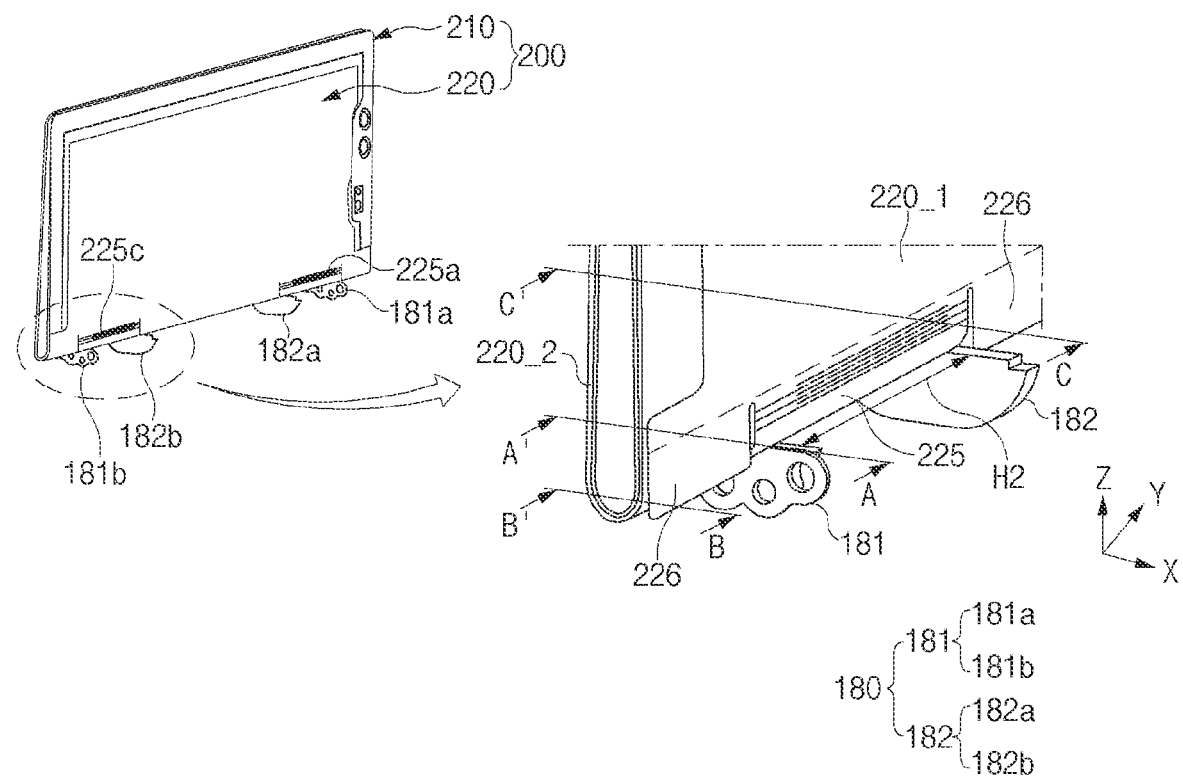
FIG. 9 illustrates the display module and the guide member of the electronic device according to an embodiment.

The length H1 of the bending portion 225 may be formed to correspond to the distance (e.g., H2 of FIG. 9) between guide members (e.g., a hinge module guide member 181 and a hinge cover guide member 182 of FIG. 9) that support the bending portion 225. For example, the length H1 of the bending portion 225 may be formed to be greater than the distance (e.g., H2 of FIG. 9) between the hinge module guide member 181 and the hinge cover guide member 182, which are disposed to face each other, such that the opposite ends of the bending portion 225 are supported by the guide members (e.g., the hinge module guide member 181 and the hinge cover guide member 182).

Referring to FIGS. 7A and 7B, the first areas 2251 may include the plurality of slits 228a or 228b, which are formed through at least parts of the first areas 2251, such that at least part of the bending portion 225 or 225' is bendable while the first areas 2251 are deformed.

The plurality of slits 228a or 228b may be formed in a long narrow hole shape by cutting away parts of the first areas 2251 along the lengthwise direction of the bending portion 225 or 225'. The bending portion 225 or 225' may be configured to be moved relative to the attachment areas 221 and 222 and the non-deformable portions 226 of the support plate 220 other than the bending portion 225 or 225' by the plurality of slits 228a or 228b. For example, the bending portion 225 or 225' may be bent or unbent in the direction perpendicular to the lengthwise direction of the bending portion 225 or 225' by the plurality of slits 228a or 228b.

The plurality of slits 228a or 228b may form a specified pattern. The plurality of slits 228a or 228b may include the first slits 228a discontinuously formed along the lengthwise direction of the bending portion 225 or the second slits 228b continuously formed along the lengthwise direction of the bending portion 225'. In FIG. 7A, the bending portion 225 may include a lattice pattern formed by the plurality of first slits 228a. In FIG. 7B, the bending portion 225' may include a slit pattern formed by the plurality of second slits 228b. In this case, a plurality of pieces of the bending portion 225' that are formed by the second slits 228b may be bonded through an adhesive member, or may be connected together through an insert molding process.

The bending portions 225 and 225' may be configured such that the first slits 228a and the second slits 228b are formed together. For example, the bending portions 225 and 225' may be formed in a form in which the plurality of second slits 228b are disposed between the plurality of first slits 228a. The bending portions 225 and 225' may include a plurality of dents in partial areas of the bending portions 225 and 225'.

In FIG. 7C, at least parts of the first areas 2251 may be formed of the flexible material 229 such that at least part of the bending portion 225" is bendable while the first areas 2251 are deformed. For example, the flexible material 229 constituting the bending portion 225" may be formed of a material having a different stiffness from the attachment areas 221 and 222 and the non-deformable portions 226 of the support plate 220 other than the bending portion 225". The bending portion 225" may be configured to be moved relative to the attachment areas 221 and 222 and the non-deformable portions 226 of the support plate 220 by the flexible material 229. For example, the bending portion 225" may be bent or unbent in a direction perpendicular to the lengthwise direction of the bending portion 225" by the flexible material 229.

The flexible material 229 may include a polymer material, rubber, or a leather material. The support plate 220 may be configured such that the flexible material 229 is located in the bending portion 225" of the support plate 220 through an injection molding process. However, a manufacturing process of the bending portion 225" including the flexible material 229 is not limited thereto, and the bending portion 225" including the flexible material 229 may be manufactured through various processes.

Each of the bending portions 225, 225', and 225" may include the first areas 2251 that are variable areas and the second areas 2252 that are invariable areas. However, the disclosure is not limited thereto, and the bending portions 225, 225', and 225" may not include the second areas 2252, and the entire bending portions 225, 225', and 225" may be formed to be deformable areas. For example, in the bending portion 225 illustrated in FIG. 7A, the first slits 228a may be extended to the second areas 2252, and accordingly the entire bending portion 225 may be formed to be a variable area. In the bending portion 225' illustrated in FIG. 7B, the second slits 228b may be extended to the second areas 2252, and accordingly the entire bending portion 225' may be formed to be a variable area. In the bending portion 225" illustrated in FIG. 7C, the entire area of the bending portion 225" may be formed of the flexible material 229. Accordingly, the entire bending portion 225" may be formed to be a variable area.

Figure 8A:
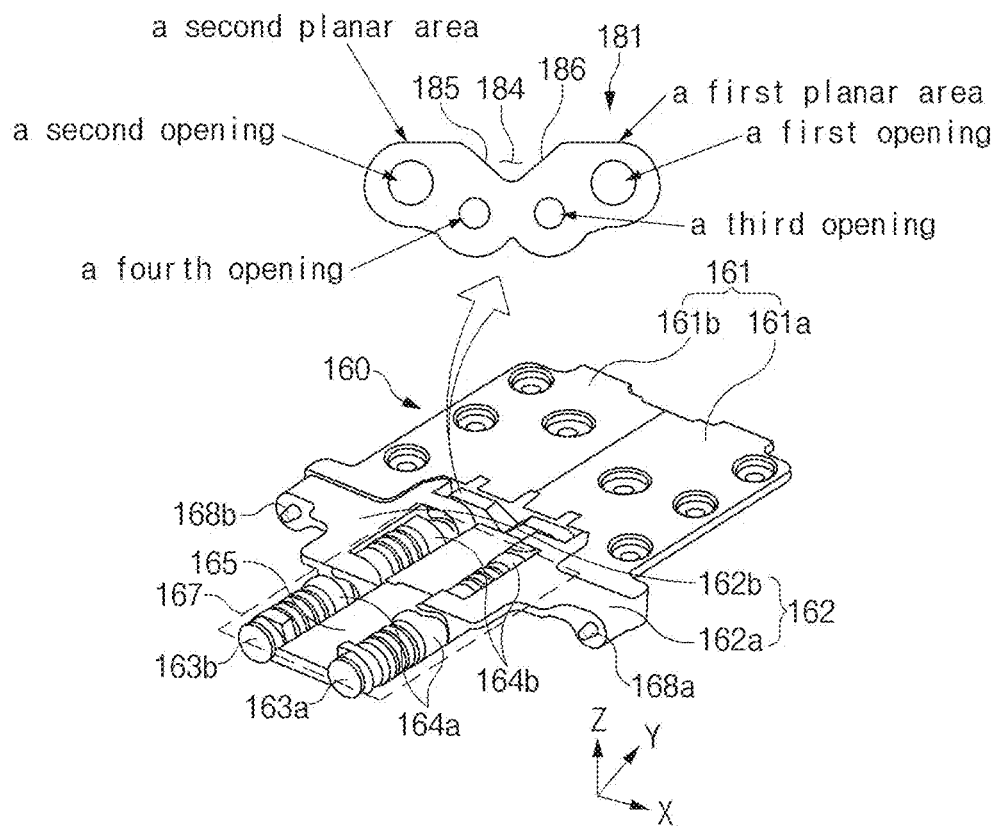
FIG. 8A illustrates a hinge module and a guide member of the electronic device according to an embodiment.
Figure 8B:
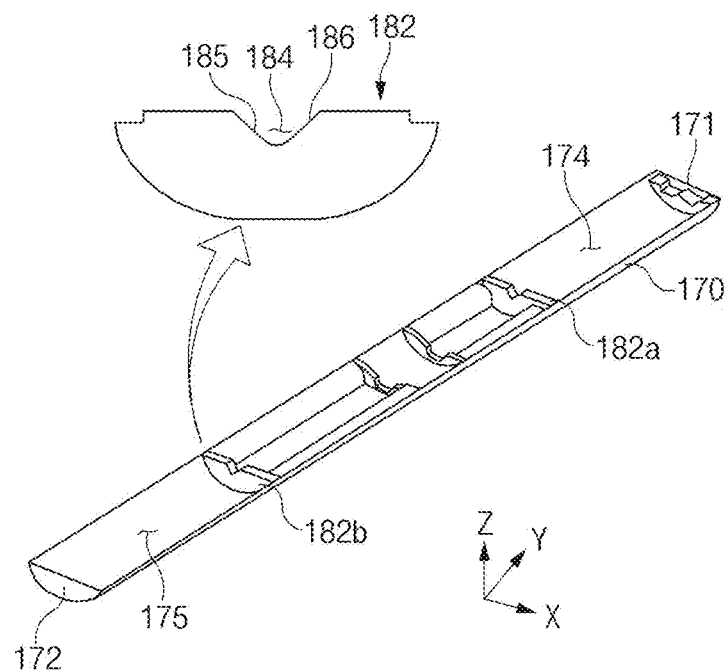
FIG. 8B illustrates a hinge cover and a guide member of the electronic device according to an embodiment.

FIG. 8A illustrates a hinge module and a guide member of the electronic device according to an embodiment. FIG. 8B illustrates a hinge cover and a guide member of the electronic device according to an embodiment.

FIG. 8A illustrates the hinge module and the guide member disposed on the hinge module. FIG. 8B illustrates the hinge cover and the guide member disposed on the hinge cover. For convenience of description, FIG. 8A illustrates one hinge module. Hereinafter, the hinge module may include the first hinge module 160a and the second hinge module 160b described above with reference to FIG. 4.

Referring to FIGS. 8A and 8B, the guide members 180 may be disposed on the hinge module 160 and the hinge cover 170. For example, the guide members 180 may include the first guide member 181a and the second guide member 181b disposed on the pair of hinge modules 160, respectively, and the third guide member 182a and the fourth guide member 182b disposed on the hinge cover 170.

The hinge module 160 may include the bracket structure 161, the arm structure 162, and the detent structure 167.

The bracket structure 161 may include the plurality of brackets 161a and 161b coupled with the first housing 110 and the second housing 120. For example, the plurality of brackets 161a and 161b may include the first rotary bracket 161a coupled with the first housing 110 and the second rotary bracket 161b coupled with the second housing 120. The first rotary bracket 161a and the second rotary bracket 161b may rotate together with the first housing 110 and the second housing 120 when the electronic device 100 is folded or unfolded. In a folded state of the electronic device 100, the first rotary bracket 161a and the second rotary bracket 161b may be disposed to face each other. The plurality of brackets 161a and 161b may include a plurality of coupling holes for coupling with the first housing 110 and the second housing 120.

The arm structure 162 may include a plurality of arm members 162a and 162b that are rotatable within a predetermined range (e.g., 0° to 90° or 10° to 80°). For example, the plurality of arm members 162a and 162b may include the first arm member 162a connected with the first rotary bracket 161a and the second arm member 162b connected with the second rotary bracket 161b. The plurality of arm members 162a and 162b may be connected with partial areas of the plurality of brackets 161a and 161b through connecting members 168a and 168b and may slide while rotating with respect to the plurality of brackets 161a and 161b when the first housing 110 and the second housing 120 rotate. The first guide member 181a and the second guide member 181b may be disposed in an empty space between the arm structure 162 and the bracket structure 161.

The detent structure 167 may include a first rotary shaft 163a, a second rotary shaft 163b, first cam members 164a, second cam members 164b, and a center bar 165. The first rotary shaft 163a and the second rotary shaft 163b may provide tension of a cam type detent. The first rotary shaft 163a and the second rotary shaft 163b may have a length greater than a separation distance between cam structures formed on the plurality of arm members 162a and 162b. The first rotary shaft 163a and the second rotary shaft 163b may be spaced apart from each other at a predetermined interval in the X-axis direction and may be disposed side by side in the Y-axis direction. The first cam members 164a and the second cam members 164b may have bumpy structures corresponding to the cam structures formed on the plurality of arm members 162a and 162b. The first cam members 164a and the second cam members 164b may be engaged with the cam structures formed on the plurality of arm members 162a and 162b through the above-described structure and may fix movements of the arm members 162a and 162b when the electronic device 100 is in a folded state. The center bar 165 may have a rod shape in which the length in the Y-axis direction is greater than the length in the X-axis direction. The center bar 165 may be disposed in a space between the first rotary shaft 163a and the second rotary shaft 163b and may support at least a partial area of the display module 200.

The hinge cover 170 may include a recess in which at least part of the hinge module 160 and the hinge cover guide members 182 are disposed.

The hinge cover 170 may be configured such that the third guide member 182a and the fourth guide member 182b are disposed to face each other inside the hinge cover 170. The hinge cover 170 may include the first space 174 formed between one end portion 171 of the hinge cover 170 and the third guide member 182a and the second space 175 formed between an opposite end portion 172 of the hinge cover 170 and the fourth guide member 182b. The first hinge module 160a may be disposed in the first space 174 such that the first guide member 181a and the third guide member 182a face each other. The second hinge module 160b may be disposed in the second space 175 such that the second guide member 181b and the fourth guide member 182b face each other. The hinge module 160 may be disposed such that the bracket structure 161 faces toward the one end portion 171 or the opposite end portion 172 of the hinge cover 170 and the detent structure 167 faces toward the third guide member 182a or the fourth guide member 182b.

The guide members 181 and 182 may include recesses 184 that are concavely formed on partial areas of surfaces facing the +Z-axis direction of the guide members 181 and 182. Each of the recesses 184 may include a first inclined surface 186 and a second inclined surface 185 disposed to face each other. The first inclined surface 186 and the second inclined surface 185 may be formed to be inclined downward toward the folding axis F. The first inclined surface 186 and the second inclined surface 185 may be symmetric to each other with respect to the folding axis F. The recesses 184 formed on the first guide member 181a, the second guide member 181b, the third guide member 182a, and the fourth guide member 182b may have substantially the same shape. The recesses 184 may be arranged in the Z-axis direction so as to at least partially face the bending portions 225 of the support plate 220 and the folding area 215 of the display panel 210. The bending portions 225 may be bent while being at least partially brought into contact with the recesses 184 in a folded state of the electronic device 100 (see FIGS. 10A and 12B).

As shown, the hinge module guide members 181 disposed on the hinge module 160 and the hinge cover guide members 182 disposed on the hinge cover 170 may have different shapes. However, this is illustrative, and the shapes of the guide members 181 and 182 may be variously modified.

Figure 10A:
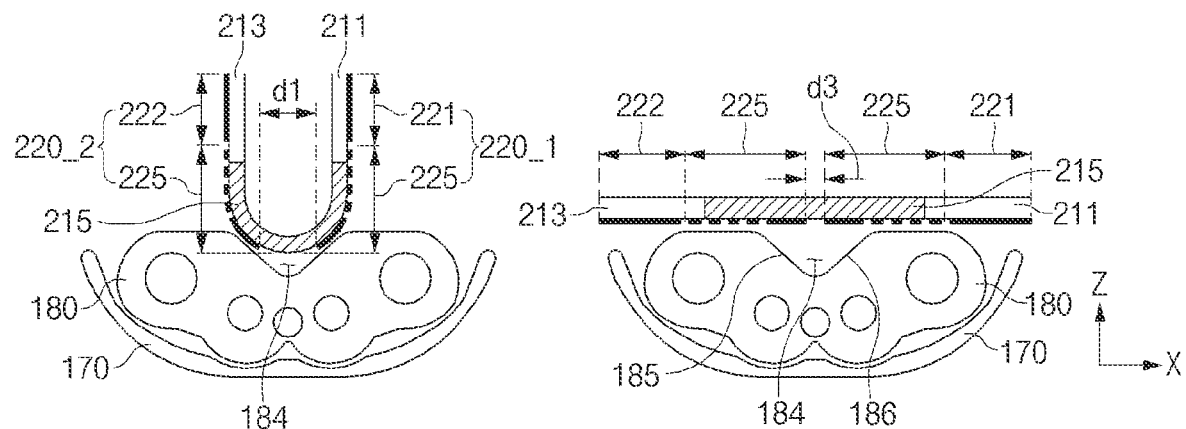
FIG. 10A illustrates a section of the display module and the guide member of the electronic device according to an embodiment.
Figure 10B:
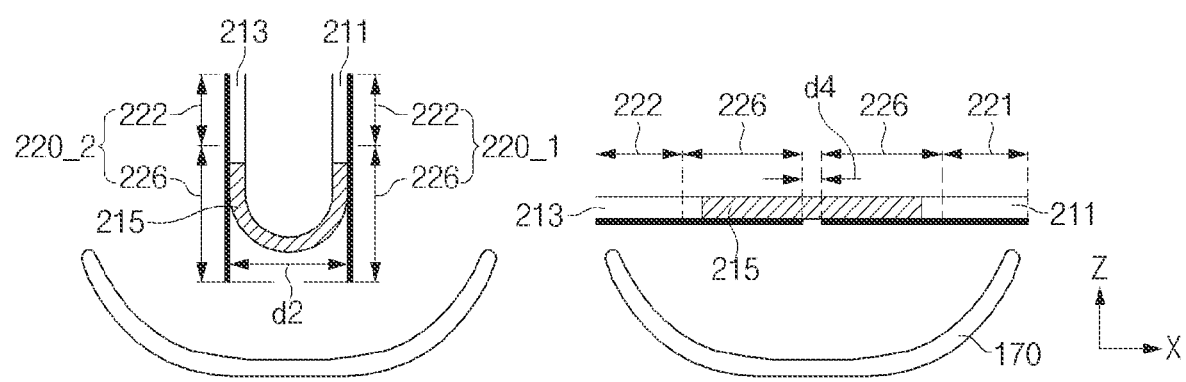
FIG. 10B illustrates a section of the display module and the hinge cover of the electronic device according to an embodiment.

FIG. 9 illustrates the display module and the guide member when the electronic device is in a folded state according to an embodiment. FIG. 10A illustrates a section of the display module and the guide member of the electronic device according to an embodiment. FIG. 10B illustrates a section of the display module and the hinge cover of the electronic device according to an embodiment.

In the folded state in FIG. 9, the housing structure, the hinge cover, and the hinge module are omitted. A section taken along line A-A' of FIG. 9 is illustrated on a left side of FIG. 10A, and a section when the display module is unfolded is illustrated on a right side of FIG. 10A. A section taken along line B-B' or C-C' of FIG. 9 is illustrated on a left side of FIG. 10B, and a section when the display module is unfolded is illustrated on a right side of FIG. 10B.

Referring to FIGS. 9, 10A, and 10B, in the folded state of the electronic device 100, at least parts of the bending portions 225 may be bent by contacting the recesses 184 of the guide members 180.

In the folded state of the electronic device 100, opposite end portions facing the −Y/Y-axis direction of each of the bending portions 225 may be supported by the hinge module guide member 181 and the hinge cover guide member 182. For example, opposite end portions of the first bending portion 225a may be brought into contact with the first guide member 181a and the third guide member 182a and may be supported by the first guide member 181a and the third guide member 182a. Opposite end portions of the second bending portion 225b symmetric to the first bending portion 225a may be brought into contact with the first guide member 181a and the third guide member 182a and may be supported by the first guide member 181a and the third guide member 182a. Opposite end portions of the third bending portion 225c may be brought into contact with the second guide member 181b and the fourth guide member 182b and may be supported by the second guide member 181b and the fourth guide member 182b. Opposite end portions of the fourth bending portion 225d symmetric to the third bending portion 225c may be brought into contact with the second guide member 181b and the fourth guide member 182b and may be supported by the second guide member 181b and the fourth guide member 182b. Accordingly, in the folded state of the electronic device 100, the bending portions 225 may stably maintain a state in which at least parts thereof are deformed in a predetermined bent state.

When the electronic device 100 is in the folded state, at least parts of the bending portions 225 may be received in the recesses 184. When the electronic device 100 is in an unfolded state, the bending portions 225 may be separated from the recesses 184 and may form substantially the same plane as the attachment areas 221 and 222. In the folded state, at least parts of the bending portions 225 may be received in the recesses 184 and may be brought into contact with the inclined surfaces 185 and 186 of the recesses 184. Accordingly, the at least parts of the bending portions 225 may be bent toward the folding axis F.

In the unfolded state, the bending portions 225 may be located on substantially the same plane as the attachment areas 221 and 222 and may support the folding area 215 of the display panel 210. The support plate 220 may be spaced apart from the guide members 180. However, the disclosure is not limited thereto, and the bending portions 225 may be brought into contact with and supported by the guide members 180 when the electronic device 100 is in the unfolded state. For example, at least parts of the bending portions 225 may be separated from the recesses 184 and may be brought into contact with flat portions of the guide members 180, which are connected with the inclined surfaces 185 and 185, to form substantially the same plane as the attachment areas 221 and 222. Accordingly, areas where the bending portions 225 are brought into contact with the guide members 180 may differ from each other depending on operational states of the electronic device 100.

The non-deformable portions 226 may remain substantially flat irrespective of operational states of the electronic device 100. When the electronic device 100 is in the folded state, the non-deformable portions 226 may not be supported by the guide members 180. Accordingly, the non-deformable portions 226 may not be deformed in the folded state and may extend toward the hinge cover 170 while forming the same planes as the attachment areas 221 and 222. When the electronic device 100 is in the unfolded state, the non-deformable portions 226 may be located on substantially the same plane as the attachment areas 221 and 222 and may support the folding area 215 of the display panel 210.

In the folded state of the electronic device 100, the gap in the X-axis direction between the bending portions 225 of the first support plate 220_1 and the bending portions 225 of the second support plate 220_2 may differ from the gap in the X-axis direction between the non-deformable portions 226 of the first support plate 220_1 and the non-deformable portions 226 of the second support plate 220_2. For example, comparing FIGS. 10A and 10B, when the electronic device 100 is in the unfolded state, the distance d3 between the bending portions 225 of the first support plate 220_1 and the bending portions 225 of the second support plate 220_2 may be substantially the same as the distance d4 between the non-deformable portions 226 of the first support plate 220_1 and the non-deformable portions 226 of the second support plate 220_2. When the electronic device 100 is in the folded state, the distance d1 between the bending portions 225 of the first support plate 220_1 and the bending portions 225 of the second support plate 220_2 may be less than the distance d2 between the non-deformable portions 226 of the first support plate 220_1 and the non-deformable portions 226 of the second support plate 220_2 depending on bending deformation of the bending portions 225.

The electronic device 100 may be configured such that detent structures 167 of a hinge module 160 are located under the bending portions 225 and bracket structure 161 of the hinge module 160 or empty spaces of the hinge cover 170 are located under the non-deformable portions 226. The positional relationship may be determined as the first guide member 181a or the second guide member 181b is disposed between the detent structure 167 and the bracket structure 161 and the detent structure 167 is disposed to face the third guide member 182a or the fourth guide member 182b.

The detent structures 167 may be located under the first bending portion 225a and the third bending portion 225c of the first support plate 220_1 (e.g., in the −Z-axis direction). An empty space of the hinge cover 170 may be located under the first non-deformable portion 226a. The bracket structures 161 may be located under the second non-deformable portion 226b and the third non-deformable portion 226c. The second bending portion 225b, the fourth bending portion 225d, the fourth deformable portion 226d, the fifth deformable portion 226e, and the sixth deformable portion 226f of the second support plate 220_2 may be symmetric to the first bending portion 225a, the third bending portion 225c, the first non-deformable portion 226a, the second non-deformable portion 226b, and the third non-deformable portion 225c of the first support plate 220_2. Accordingly, the positional relationship between the hinge structure 150 and the areas of the second support plate 220_2 (e.g., the bending portions 225 and the non-deformable portions 226 of the second support plate 220_2) may correspond to the positional relationship between the hinge structure 150 and the areas of the first support plate 220_1 (e.g., the bending portions 225 and the non-deformable portions 226 of the first support plate 220_1).

The bending portions 225 may be formed in positions that face the detent structure 167 of the hinge module 160 that interfere with the support plate 220 when the support plate 220 rotates within a predetermined range when an operational state of the electronic device 100 is changed. The construction of the electronic device 100 may decrease the radius of rotation of the support plate 220 that is required to prevent interference and collision between the support plate 220 and the hinge structure 150 through the bending portions 225 capable of bending deformation. Meanwhile, the first non-deformable portion 226a and the fourth non-deformable portion 226d may be formed in positions that face empty spaces of the hinge cover 170, and thus interference may not occur even though the support plate 220 rotates. The second non-deformable portion 226b, the third non-deformable portion 226c, the fifth non-deformable portion 226e, and the sixth non-deformable portion 226f may be formed in positions that face the bracket structure 161 of the hinge module 160 that rotate together with the support plate 220, and thus interference may not occur.

Figure 11:
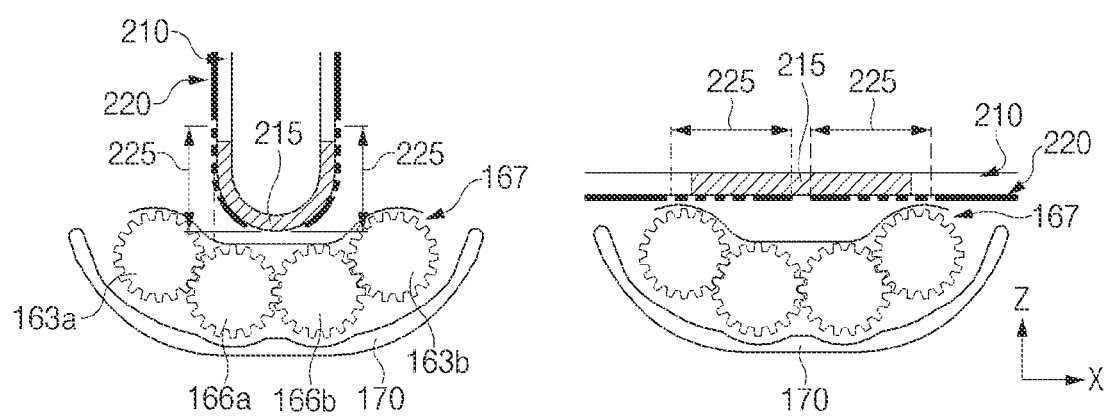
FIG. 11 illustrates a section of the display module and the hinge module of the electronic device according to an embodiment.

FIG. 11 illustrates a section of the display module and the hinge module of the electronic device according to an embodiment.

Referring to FIG. 11, at least parts of the bending portions 225 of the support plate 220 may be disposed to face the detent structure 167 of the hinge module 160. FIG. 11 illustrates a section of the bending portions 225 and the hinge module 160 when the hinge module 160 is disposed under the bending portions 225.

Shaft gears may be formed on at least parts of the first rotary shaft 163 and the second rotary shaft 163b included in the detent structure 167 of the hinge module 160, and the hinge module 160 may include idle gears 166a and 166b disposed to be engaged with the shaft gears. The first rotary shaft 163a, the second rotary shaft 163b, and the idle gears 166a and 166b may be engaged to rotate together between the display module 200 and the hinge cover 170.

Some components of the detent structure 167 may remain disposed in specified positions, irrespective of operational states of the electronic device 100. The bending portions 225 may be bent together with the folding area 215 in a folded state of the electronic device 100. Accordingly, when the display panel 210 is folded, the bending portions 225 may remain spaced apart from the detent structure 167 without colliding with the detent structure 167.

When the bending portions 225 are not formed in the support plate 220, at least parts of the support plate 220 (e.g., portions shown by dotted lines) may collide and interfere with the hinge module 160. In this case, to prevent the collision and the interference, the support plate 220 needs to be spaced apart from the hinge module 160 at a predetermined interval or more in the +Z-axis direction. The predetermined interval may be required for ensuring the radius of rotation of the support plate 220. For example, the radius of rotation of the support plate 220 may refer to the range in which rotational interference occurs between the support plate 220 and the hinge module 160. Accordingly, the range of rotational interference may be decreased as the radius of rotation of the support plate 220 is decreased.

The support plate 220 may include the bending portions capable of bending deformation, thereby decreasing the range of rotational interference between the support plate 220 and the hinge module 160 and reducing the interval between the support plate 220 and the hinge module 160 in the Z-axis direction.

Figure 12A:
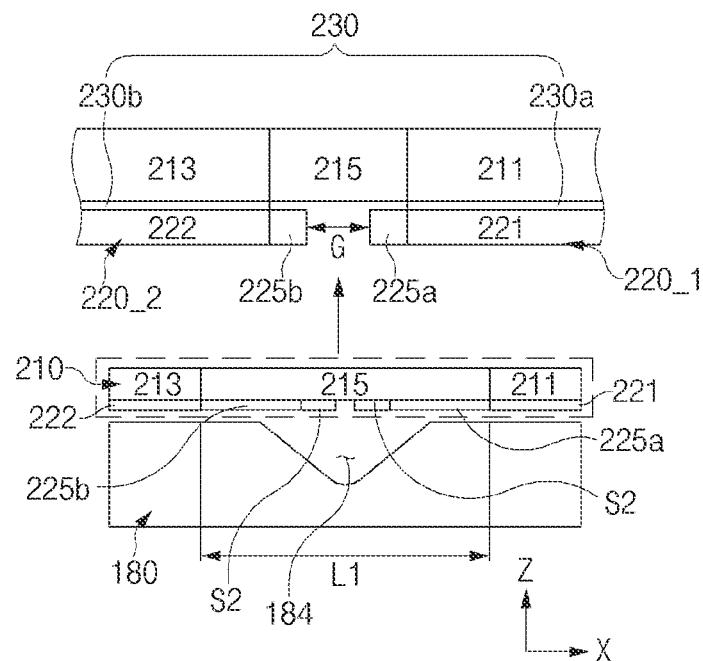
FIG. 12A illustrates a section of the display module and the guide member when the electronic device is in an unfolded state according to an embodiment.
Figure 12B:
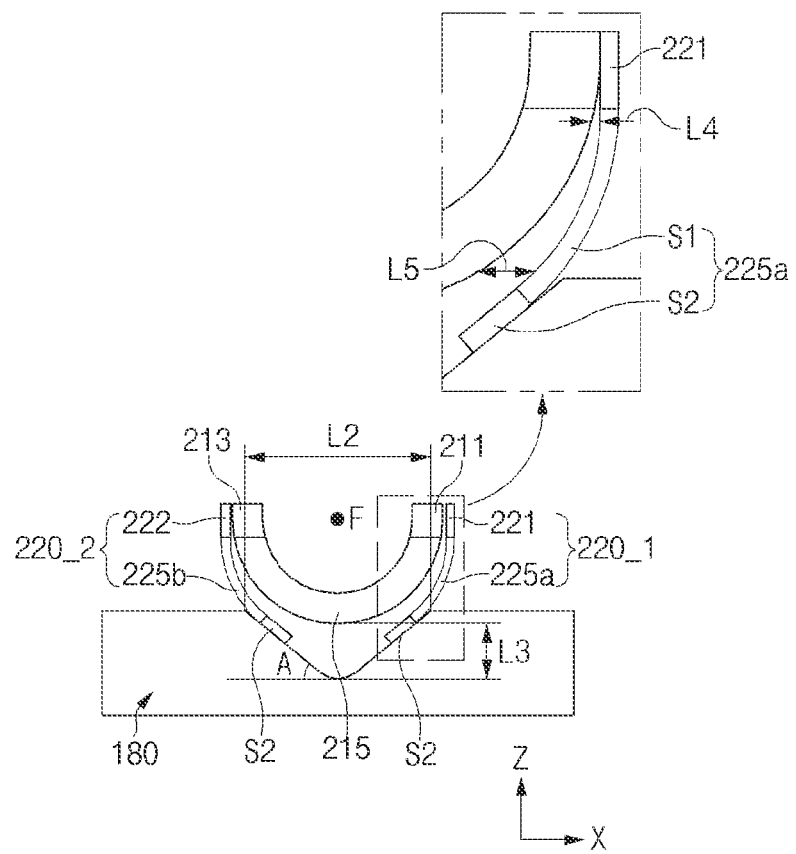
FIG. 12B illustrates a section of the display module and the guide member when the electronic device is in a folded state according to an embodiment.

FIG. 12A illustrates a section of the display module and the guide member when the electronic device is in an unfolded state according to an embodiment. FIG. 12B illustrates a section of the display module and the guide member when the electronic device is in a folded state according to an embodiment.

Referring to FIGS. 12A and 12B, the display module 200 may be disposed over the guide member 180 in the +Z-axis direction such that at least part of the folding area 215 and at least parts of the bending portions 225a and 225b face the recess 184. For convenience of description, FIGS. 12A and 12B illustrate a section of the first bending portion 225a and the second bending portion 225b. However, contents to be described below may be identically applied to the third bending portion 225c and the fourth bending portion 225d.

The guide member 180 may be disposed to face at least part of the folding area 215 with the support plate 220 therebetween. The bending portions 225a and 225b may be formed in partial areas of the support to at least partially face the folding area 215 and may be configured to be deformable.

The support plate 220 may be attached to the display panel 210 through an adhesive member 230 disposed between at least a partial area of the display panel 210 and a partial area of the support plate 220. The adhesive member 230 may be disposed between the attachment areas 221 and 222 of the support plate 220 and the display panel 210.

The adhesive member 230 may include a first adhesive member 230a disposed between the first attachment area 221 and the first flat area 211 and a second adhesive member 230b disposed between the second attachment area 222 and the second flat area 213. The first adhesive member 230a and the second adhesive member 230b may be spaced apart from each other, and an unattached area may be formed between the folding area 215 and the bending portions 225a and 225b.

As the first bending portion 225a and the second bending portion 225b are not attached to the folding area 215 and the folding area 215 forms a flat surface or a curved surface, FIG. 12A illustrates that the first bending portion 225a and the second bending portion 225b may be brought into contact with the folding area 215 and may support the flat surface formed by the folding area 215 in an unfolded state of the electronic device 100, while FIG. 12B illustrates that the first bending portion 225a and the second bending portion 225b may be spaced apart from the folding area 215 and may extend in the direction of tangential surfaces to the curved surface formed by the folding area 215 in a folded state of the electronic device 100.

In a folded state of the electronic device 100, the folding area 215 in FIG. 12B may form a curved surface. In the folded state, the bending portions 225a and 225b may be spaced apart from the folding area 215 and may be at least partially received in the recess 184. One end portion (e.g., an end portion facing the −Z-axis direction) of the first bending portion 225a and one end portion (e.g., an end portion facing the −Z-axis direction) of the second bending portion 225b inside the recess 184 may be brought into contact with the inclined surfaces 185 and 185 and may be bent toward the folding axis F. In the folded state, the distance by which the folding area 215 and the bending portions 225 are spaced apart from each other may be increased toward the direction in which the recess 184 is concavely formed. The distance L5 between the folding area 215 and the one end portion (e.g., the end portion facing the −Z-axis direction) of each of the first bending portion 225a and the second bending portion 225b may be greater than the distance L4 between the folding area 215 and an opposite end portion (e.g., an end portion facing the +Z-axis direction) of each of the first bending portion 225a and the second bending portion 225b, or between the folding area 215 and the borders between the bending portions 225 and the attachment areas 221 and 222.

At least parts of the bending portions 225a and 225b may be formed to be variable sections S1 capable of deformation, and the remaining parts of the bending portions 225a and 225b other than the variable sections S1 may be formed to be invariable sections S2 that are not deformed. For example, the variable sections S1 may be the first areas 2251 of the bending portions 225, 225', and 225" illustrated in FIGS. 7A, 7B and 7C. The invariable sections S2 may be the second areas 2252 of the bending portions 225, 225', and 225" illustrated in FIGS. 7A, 7B and 7C. The invariable sections S2 may be formed in the one end portion of the first bending portion 225a and the one end portion of the second bending portion 225b. For example, the variable section S1 of the first bending portion 225a may extend from the first attachment area 221, and the invariable section S2 of the first bending portion 225a may extend from the variable section S1 of the first bending portion 225a. The variable section S1 of the second bending portion 225b may extend from the second attachment area 222, and the invariable section S2 of the second bending portion 225b may extend from the variable section S1 of the second bending portion 225b. Alternatively, the entire first bending portions 225a and the entire second bending portion 225b may be formed to be variable areas or sections.

The recess 184 may be formed to control the positions and bending angles of the bending portions 225a and 225b in the folded state of the electronic device 100. For example, the width L2 of the recess 184 may be less than the length L1 of a bending section of the support plate 220. The length L1 of the bending section may refer to the distance L1 between the opposite end portion of the first bending portion 225a (e.g., the border between the first bending portion 225a and the first attachment area 221) and the opposite end portion of the second bending portion 225b (e.g., the border between the second bending portion 225b and the second attachment area 222) when the electronic device 100 is in an unfolded state. The recess 184 may have a specified tilt angle A such that the bending portions 225a and 225b are bendable in a predetermined shape in the folded state. Based on the degree to which the display panel 210 sags or moves toward the guide member 180 in the −Z-axis direction in the folded state, the recess 184 may have a specified depth L3 such that interference does not occur between the display panel 210 and the guide member 180.

In the electronic device 100, the first support plate 220_1 and the second support plate 220_2 may be spaced apart from each other by a predetermined gap G to prevent interference and collision between the support plate 220 and the hinge structure 150 of the electronic device 100 by rotation of the support plate 220 when the electronic device 100 is folded or unfolded. Accordingly, an empty space may be formed between the display panel 210 and the support plate 220, and a partial area of the folding area 215 of the display panel 210 may not be supported by the support plate 220.

The gap G between the first support plate 220_1 and the second support plate 220_2 may be reduced by decreasing the radius of rotation of the support plate 220 through the structure of the support plate 220 including the bending portions 225a and 225b. With the reduction in the gap G, the empty space between the display panel 210 and the support plate 220 may be reduced. Accordingly, deterioration in durability of the electronic device 100, occurrence of flexure of the display panel 210, and deformation of the display panel 210 may be prevented.

Figure 13A:
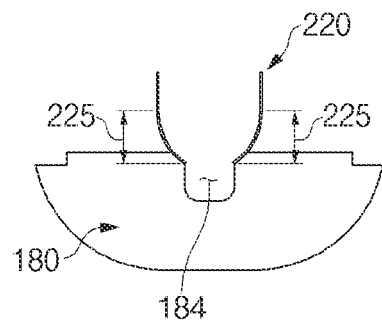
FIG. 13A illustrates a support plate and a guide member according to a first embodiment.
Figure 13B:
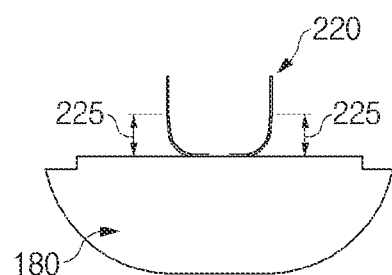
FIG. 13B illustrates a support plate and a guide member according to a second embodiment.
Figure 13C:
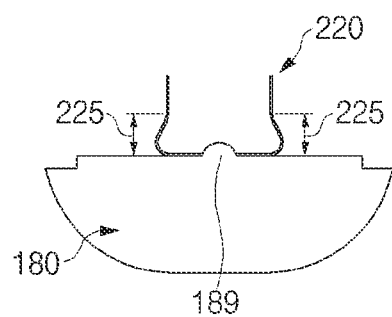
FIG. 13C illustrates a support plate and a guide member according to a third embodiment.

FIG. 13A illustrates a support plate and a guide member of the electronic device according to a first embodiment. FIG. 13B illustrates a support plate and a guide member of the electronic device according to a second embodiment. FIG. 13C illustrates a support plate and a guide member of the electronic device according to a third embodiment.

The guide members illustrated in FIGS. 13A, 13B and 13C differ from the guide members illustrated in FIGS. 8A and 8B with respect to the shape of a recess or whether a recess is formed.

Referring to FIGS. 13A, 13B and 13C, the guide members 180 may contact at least parts of bending portions 225 of the support plates 220 to deform the bending portions 225 and support the bending portions 225 to maintain the deformed states of the bending portions 225. The guide members 180 may guide the bending portions 225 such that the bending portions 225 are deformed in predetermined forms. The shapes and configurations of the guide members 180 may vary.

In the first embodiment in FIG. 13A, the guide member 180 may include a recess 184 in which at least parts of the bending portions 225 are received and by which the at least parts of the bending portions 225 are supported. The recess 184 may be variously formed. For example, unlike the recess 184 illustrated in FIGS. 8A and 8B, the recess 184 illustrated in FIG. 13A may include at least a portion implemented with an inclined surface and other portions implemented with vertical surfaces.

In the second embodiment in FIG. 13B, the guide member 180 may not include the recess 184 and the bending portions 225 may be deformed in a predetermined shape by contacting an upper surface of the guide member 180. For example, the bending portions 225 may be bent at an angle of substantially 90 degrees by the upper surface of the guide member 180.

In the third embodiment in FIG. 13C, the guide member 180 may include a guide protrusion 189 that protrudes from an upper surface of the guide member 180. The bending portions 255 may be deformed in a predetermined shape by contacting the guide protrusion 189. The bending portions 225 may be bent at an angle of substantially more than 90 degrees by the guide protrusion 189.

Figure 14:
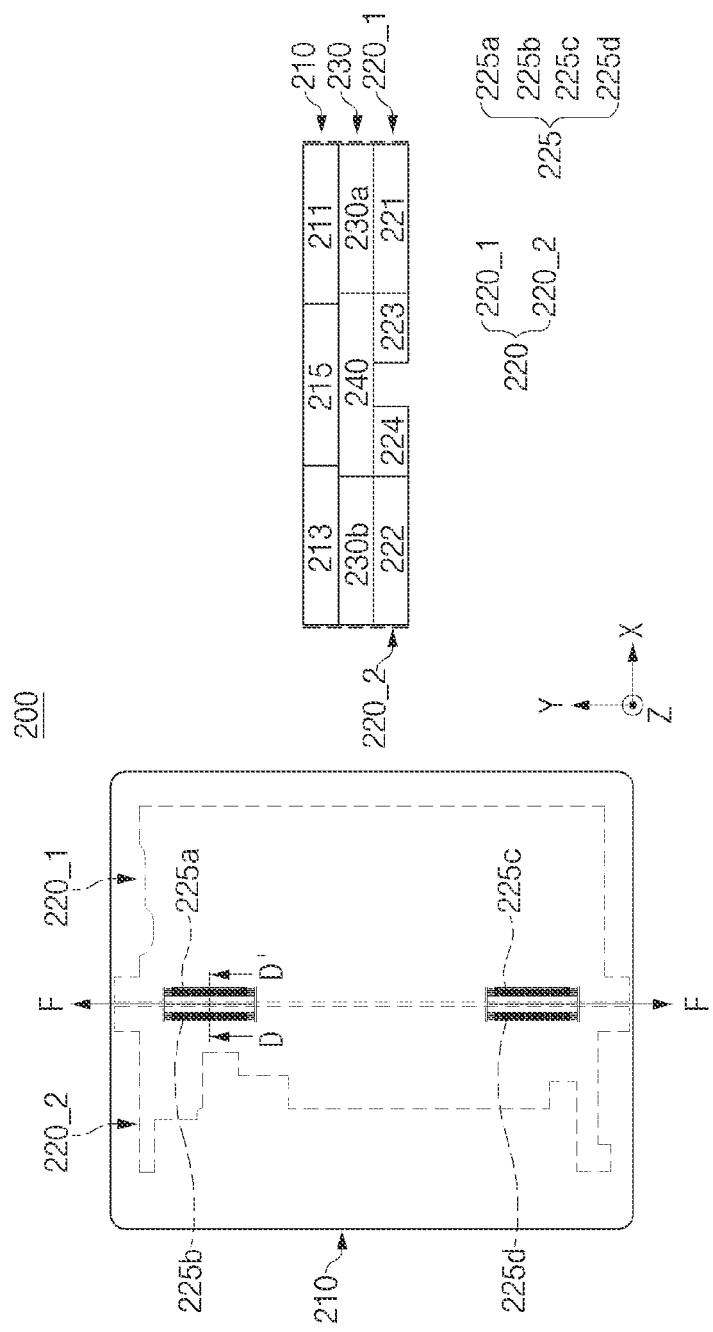
FIG. 14 illustrates a plan view and a sectional view of the display module of the electronic device according to an embodiment.

FIG. 14 illustrates a plan view and a sectional view of the display module of the electronic device according to an embodiment.

The sectional view of FIG. 14 is taken along line D-D' in the plan view.

Referring to FIG. 14, the display module 200 may include the display panel 210, the support plate 220 disposed on the rear surface of the display panel 210, and the adhesive member 230 and a reinforcing member 240 disposed between the display panel 210 and the support plate 220.

The sectional view of FIG. 14 illustrates a section of part of the first extending area 223 in which the first bending portion 225a is formed and part of the second extending area 224 in which the second bending portion 225b is formed. However, this is for the purpose of description, and components (e.g., the reinforcing member 240 and the adhesive member 230) of the display module 200 to be described below with reference to FIG. 14 may be identically applied to the areas in which the third bending portion 225c and the fourth bending portion 225d are formed.

The support plate 220 may include the first support plate 220_1 and the second support plate 220_2. At least parts of the first support plate 220_1 and the second support plate 220_2 may be attached to the display panel 210 by the adhesive member 230. The adhesive member 230 may include the first adhesive member 230a and the second adhesive member 230b. The first adhesive member 230a may be disposed between the first support plate 220_1 and the display panel 210 and may attach at least part of the first support plate 220_1 to the display panel 210. The second adhesive member 230b may be disposed between the second support plate 220_2 and the display panel 210 and may attach at least part of the second support plate 220_2 to the display panel 210.

The first adhesive member 230a may be attached to the first flat area 211 of the display panel 210. The second adhesive member 230b may be attached to the second flat area 213 of the display panel 210. The adhesive member 230 may attach the attachment areas 221 and 222 of the support plate 220 to the display panel 210. For example, the first adhesive member 230a may be disposed between the first flat area 211 and the first attachment area 221 of the first support plate 220_1. The second adhesive member 230b may be disposed between the second flat area 213 and the second attachment area 222 of the second support plate 220_2. The first adhesive member 230a may have less area than the first flat area 211. The second adhesive member 230b may have less area than the second flat area 213. For example, the first adhesive member 230a may have a narrower width than the first flat area 211, and the second adhesive member 230b may have a narrower width than the second flat area 213.

The first adhesive member 230a and the second adhesive member 230b may be spaced apart from each other in the direction perpendicular to the folding axis F (e.g., the X-axis direction). The display module 200 may be configured such that the adhesive member 230 is not located between the extending areas 223 and 224 and the folding area 215 for prevention of attachment of the extending areas 223 and 224 to the display panel 210. The first adhesive member 230a may not extend to an area between the first extending area 223 and the folding area 215. The second adhesive member 230b may not extend to an area between the second extending area 224 and the folding area 215.

The reinforcing member 240 may be disposed between at least part of the display panel 210 and at least part of the support plate 220. The reinforcing member 240 for supporting the bending portions 225 of the support plate 220 may be disposed between at least part of the display panel 210 and the extending areas 223 and 224. The reinforcing member 240 may be attached to a partial area of the display panel 210 and may not be attached to the extending areas 223 and 224. Alternatively, the reinforcing member 240 may be attached to the extending areas 223 and 224 and may not be attached to the display panel 210. Accordingly, the folding area 215 of the display panel 210 may be deformed to be flat or curved, and when the folding area 215 is folded, the extending areas 223 and 224 may rotate and/or deform at a predetermined angle.

The reinforcing member 240 may be located between the bending portions 225 and the folding area 215. For example, the reinforcing member 240 may not be disposed between the folding area 215 and the entire extending areas 223 and 224 but may be disposed between the folding area 215 and the areas where the bending portions 225 are formed in the extending areas 223 and 224. In this case, other members (e.g., a thickness compensation layer 250, a coating layer 260, or a film layer 270 of FIGS. 15A, 15B and 15C) may be disposed in areas other than the areas where the reinforcing member 240 is disposed between the extending areas 223 and 224 and the folding area 215.

The display module 200 may include the reinforcing member 240 to prevent sagging of partial areas of the display panel 210 that correspond to the bending portions 225. The reinforcing member 240 may be disposed between the folding area 215 and the first bending portion 225a and the second bending portion 225b to strengthen the bending portions 225 and prevent sagging of the bending portions 225 and the display panel 210. The reinforcing member 240 may improve a phenomenon in which the support plate 220 is reflected in the display panel 210. The reinforcing member 240 may be formed to be at least partially bent such that the folding area 215 forms a curved surface. The reinforcing member 240 may be formed of a metallic material, a polymer film, a glass material, or a ceramic material. However, the disclosure is not limited thereto, and the reinforcing member 240 may be implemented by using various materials.

In FIG. 14, the reinforcing member 240 may have substantially the same width as the width between the first bending portion 225a and the second bending portion 225b. However, the disclosure is not limited thereto, and the reinforcing member 240 may extend to at least parts of the first attachment area 221 and the second attachment area 222 to have a width greater than the width between the first bending portion 225a and the second bending portion 225b. In another embodiment, the reinforcing member 240 may be implemented as a layer of the display panel 210. The reinforcing member 240 may be provided as a structure that replaces all or part of a PI film layer, a sponge cushion layer, and a metal heat radiation layer inside the display panel 210.

Figure 15A:
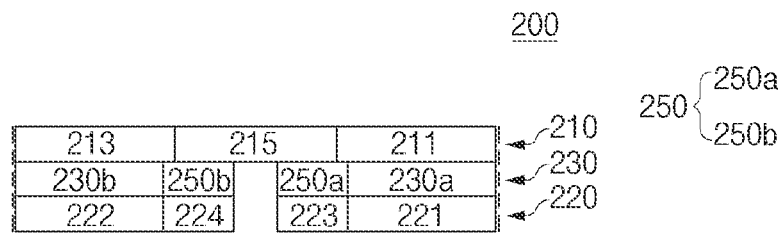
FIG. 15A is a sectional view of a display module of the electronic device according to a first embodiment.
Figure 15B:
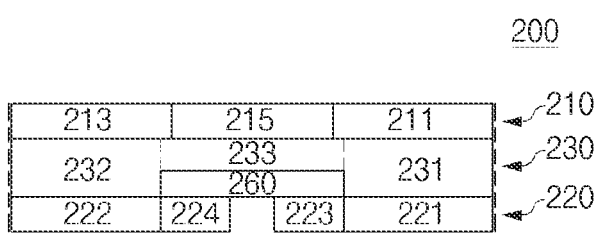
FIG. 15B is a sectional view of a display module of the electronic device according to a second embodiment.
Figure 15C:
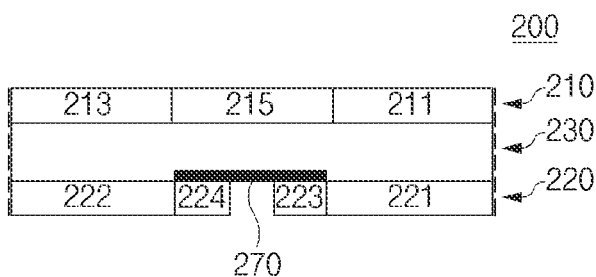
FIG. 15C is a sectional view of a display module of the electronic device according to a third embodiment.

FIG. 15A is a sectional view of a display module of the electronic device according to a first embodiment. FIG. 15B is a sectional view of a display module of the electronic device according to a second embodiment. FIG. 15C is a sectional view of a display module of the electronic device according to a third embodiment.

FIGS. 15A, 15B and 15C illustrate sections taken along line D-D' of FIG. 14. In describing FIGS. 15A, 15B and 15C, repetitive descriptions identical to ones given above will be omitted.

Referring to FIGS. 15A, 15B and 15C, the display modules 200 may include the display panel 210 including the first flat area 211, the second flat area 213, and the folding area 215, the support plate 220 including attachment areas (e.g., the first attachment area 221 and the second attachment area 222) and extending areas (e.g., the first extending area 223 and the second extending area 224), and the adhesive member 230 disposed between the display panel 210 and the support plate 220.

The display modules 200 in FIGS. 15A, 15B and 15C may further include a thickness compensation layer 250, the coating layer 260, or the film layer 270 for forming an unattached section between the extending areas 223 and 224 of the support plate 220 and a partial area of the display panel 210. The extending areas 223 and 224 of the support plate 220 to be described below with reference to FIGS. 15A, 15B and 15C may include bending portions 225 and non-deformable portions 226 (see FIG. 5A).

In the first embodiment in FIG. 15A, the display module 200 may include the thickness compensation layer 250 disposed between the extending areas 223 and 224 of the support plate 220 and the display panel 210.

The thickness compensation layer 250 may contain a polymer material or a metallic material. The thickness compensation layer 250 may prevent the folding area 215 of the display panel 210 from sagging toward the extending areas 223 and 224 of the support plate 220.

The thickness compensation layer 250 may fill at least part of a space between the first attachment area 230a and the second attachment area 230b. The thickness compensation layer 250 may be attached to only one of part of the display panel 210 or part of the support plate 220. The thickness compensation layer 250 may be attached to the display panel 210 and may not be attached to the support plate 220. Alternatively, the thickness compensation layer 250 may be attached to the support plate 220 and may not be attached to the display panel 210.

The thickness compensation layer 250 may be disposed between the extending areas 223 and 224 of the support plate 220 and the display panel 210. The thickness compensation layer 250 may include a first thickness compensation layer 250a disposed between the display panel 210 and the first extending area 223 and a second thickness compensation layer 250b disposed between the display panel 210 and the second extending area 224. The first thickness compensation layer 250a and the second thickness compensation layer 250b may be spaced apart from each other at a predetermined interval.

In the second embodiment in FIG. 15B, the display module 200 may include the coating layer 260 at least partially overlapping the adhesive member 230. The coating layer 260 may be disposed between at least part of the adhesive member 230 and the extending areas 223 and 224 of the support plate 220.

The adhesive member 230 may include a first area 231 attached to part of the first flat area 211, a second area 232 attached to part of the second flat area 213, and a third area 233 formed between the first area 231 and the second area 232. The third area 233 may be integrally formed with the first area 231 and the second area 232. The third area 233 may be disposed between the display panel 210 and the coating layer 260. The third area 233 may be attached to the display panel 210 and may not be brought into contact with the support plate 220. The width of the third area 233 may be greater than the width of the folding area 215.

The coating layer 260 may be disposed on the third area 233 of the adhesive member 230. One surface of the coating layer 260 may be attached to the third area 233, and an opposite surface of the coating layer 260 that faces away from the one surface may be brought into contact with the extending areas 223 and 224 of the support plate 220. The coating layer 260 may contain a polymer material. The coating layer 260 of the display panel 210 may be formed by coating a film having a predetermined thickness. However, the disclosure is not limited thereto, and the coating layer 260 may be formed through attachment of a single-sided sheet.

In FIG. 15B, the third area 233 may have a smaller thickness than the first area 231 and the second area 232. The sum of the thickness of the third area 233 and the thickness of the coating layer 260 may be substantially the same as the thickness of the first area 231 or the thickness of the second area 232. Accordingly, the folding area 215 of the display panel 210 may be prevented from sagging toward the extending areas 223 and 224 of the support plate 220.

In the third embodiment in FIG. 15C, the display module 200 may include the film layer 270 at least partially overlapping the adhesive member 230. The film layer 270 may be disposed between at least part of the adhesive member 230 and the extending areas 223 and 224 of the support plate 220.

The film layer 270 may contain a metallic material such as silver or an alloy or a polymer material. The film layer 270 may contain an ultraviolet (UV) curable material. The film layer 270 may include a single-sided sheet in a thin film form. The display module 200 may include the film layer 270 in a thin film form between a partial area of the adhesive member 230 and the support plate 220, and thus the adhesive member 230 may have a substantially uniform thickness. Accordingly, the folding area 215 of the display panel 210 may be prevented from sagging toward the extending areas 223 and 224 of the support plate 220. The film layer 270 in FIG. 15C may have a smaller thickness than the coating layer 260 in FIG. 15B.

As described above, an electronic device may include a housing structure including a first housing and a second housing that are folded or unfolded with respect to a folding axis F, a hinge structure that is disposed between the first housing and the second housing and that connects the first housing and the second housing such that the first housing and the second housing are rotatable relative to each other, a display panel that extends from at least part of the first housing to at least part of the second housing across the hinge structure and that includes a folding area deformable to be flat or curved, a support plate disposed on a rear surface of the display panel to support the display panel, and a guide member that is disposed to face at least part of the folding area with the support plate therebetween and that includes a recess. The support plate may include a bending portion formed in a partial area of the support plate to partially face part of the folding area, and at least part of the bending portion may be deformable. The at least part of the bending portion may be deformed by the guide member as the first housing and the second housing are folded toward each other.

The bending portion may support at least part of the folding area in an unfolded state in which the folding area forms a flat surface, and the bending portion may be partially received in the recess while being spaced apart from the folding area in a folded state in which the folding area forms a curved surface.

At least part of the bending portion may be bent toward the folding axis F by being brought into contact with the recess when the electronic device is changed from the unfolded state to the folded state.

In various embodiments, in the folded state, a distance by which the folding area and the bending portion are spaced apart from each other may increase toward a direction in which the recess is concavely formed.

The bending portion may include a plurality of slits 228a and 228b formed through at least a partial area of the support plate.

The plurality of slits may include at least one of a first slit discontinuously formed along a lengthwise direction of the bending portion or a second slit continuously formed along the lengthwise direction of the bending portion.

The bending portion may partially contain a flexible material.

The support plate may include an attachment area attached to at least part of the display panel and an extending area extending from the attachment area to partially face the folding area, and the extending area may be configured so as not to be attached to the display panel.

The extending area may include the bending portion formed in at least a partial area of the extending area and a non-deformable portion formed in a partial area of the extending area other than the bending portion.

The non-deformable portion 226 may remain substantially flat when the first housing and the second housing rotate relative to each other.

The electronic device may further include an adhesive member disposed between the display panel and the attachment area and a reinforcing member 240 disposed between the display panel and the bending portion.

The display panel may further include a first flat area and a second flat area disposed on opposite sides of the folding area and formed to be substantially flat, and the support plate may include a first support plate_1 attached to the first flat area and a second support plate_2 attached to the second flat area.

The bending portion may include a first bending portion formed in the first support plate and a second bending portion formed in the second support plate, and the first bending portion and the second bending portion may have shapes symmetric to each other with respect to the folding axis F.

One end portion of the first bending portion and one end portion of the second bending portion may be brought into contact with the recess as the first housing and the second housing are folded toward each other, and a distance L1 between an opposite end portion of the first bending portion and an opposite end portion of the second bending portion may be greater than a width L2 of the recess.

The first support plate_1 may include a third bending portion spaced apart from the first bending portion to face the first bending portion in a direction of the folding axis F. The second support plate may include a fourth bending portion spaced apart from the second bending portion in the direction of the folding axis F. The third bending portion and the fourth bending portion may have shapes symmetric to each other with respect to the folding axis F.

The hinge structure may include a hinge module including a first hinge module and a second hinge module disposed to face each other in a direction of the folding axis F and a hinge cover having the first hinge module and the second hinge module disposed on opposite end portions thereof. The guide member may be disposed on at least one of the first hinge module, the second hinge module, or the hinge cover.

The guide member may include a first guide member 181a disposed on the first hinge module, a second guide member disposed on the second hinge module, and a third guide member and a fourth guide member disposed on the hinge cover to face the first guide member and the second guide member, respectively. At least part of the bending portion may be supported by the first guide member and the third guide member, or may be supported by the second guide member and the fourth guide member, when the first housing and the second housing are folded toward each other.

As described above, an electronic device may include a housing structure including a first housing and a second housing that are folded or unfolded with respect to a folding axis F, a hinge structure that is disposed between the first housing and the second housing and that connects the first housing and the second housing such that the first housing and the second housing are rotatable relative to each other, a display module that is disposed on the first housing and the second housing and that includes a display panel including a first flat area, a second flat area, and a folding area disposed between the first flat area and the second flat area and a support plate disposed on a rear surface of the display panel, and a guide member that is disposed on at least part of the hinge structure to face at least part of the folding area with the support plate therebetween and that has a recess formed thereon. The support plate may include a first support plate attached to the first flat area and a second support plate attached to the second flat area and spaced apart from the first support plate. The first support plate and the second support plate may include a first bending portion and a second bending portion, respectively, which are symmetric to each other with respect to the folding axis F. The first bending portion and the second bending portion may be disposed to partially face the recess and may be formed to be bendable by the recess when the first housing and the second housing are folded toward each other.

The recess may include a first inclined surface and a second inclined surface symmetric to each other with respect to the folding axis F. The first inclined surface and the second inclined surface may be formed to be inclined downward at a predetermined angle A toward the folding axis F. At least part of the first bending portion may be bent toward the folding axis F by being brought into contact with the first inclined surface when the first housing and the second housing are folded toward each other. At least part of the second bending portion may be bent toward the folding axis F by being brought into contact with the second inclined surface when the first housing and the second housing are folded toward each other.

A flexible display module according to an embodiment of the disclosure may include a display panel including a first flat area, a second flat area, and a folding area disposed between the first flat area and the second flat area and a support plate disposed on a rear surface of the display panel to support the display panel. The support plate may include a bending portion formed in a partial area of the support plate to at least partially face the folding area, and at least part of the bending portion may be deformable. The bending portion may support at least part of the folding area when the folding area forms a flat surface such that the display panel is unfolded, and the bending portion may be at least partially bent while being spaced apart from the folding area when the folding area forms a curved surface such that the display panel is folded.

The support plate may include the variable section to decrease an empty space under the display, thereby reducing deterioration in durability of the display or flexure of the display.

The radius of rotation of the support plate may be decreased through the structure of the support plate, and thus the thickness of the electronic device may be reduced.

In addition, the disclosure may provide various effects that are directly or indirectly recognized.

Herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, the module may be implemented in a form of an application-specific integrated circuit (ASIC).

Embodiments as set forth herein may be implemented as software (e.g., the program) including one or more instructions that are stored in a storage medium (e.g., internal memory or external memory) that is readable by a machine (e.g., the electronic device 100). For example, a processor of the machine (e.g., the electronic device 100) may invoke at least one of the one or more instructions stored in the storage medium, and execute it, with or without using one or more other components under the control of the processor. This enables the machine to be operated to perform at least one function according to the at least one instruction invoked. The one or more instructions may include a code generated by a complier or a code executable by an interpreter. The machine-readable storage medium may be provided in the form of a non-transitory storage medium, which indicates that the storage medium is a tangible device and does not include a signal. However, this expression does not differentiate between where data is semi-permanently or temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™) or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each of the above-described components may include a single entity or multiple entities, and some of the multiple entities may be separately disposed in different components. One or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. Operations performed by the module, the program, or another component may be performed sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A portable communication device comprising:
a foldable housing including a first housing and a second housing each rotatable with respect to a first axis and a second axis;
a flexible display including a first display portion accommodated in the first housing, a second display portion accommodated in the second housing, and a third display portion between the first and second display portion and bendable according to the foldable housing being at least partially folded; and
a hinge structure disposed under the flexible display and connected with each of the first housing and the second housing,
wherein the hinge structure includes:
a hinge cover;
a rotary shaft assembly substantially accommodated in the hinge cover under the flexible display, and including a first rotary shaft and a second rotary shaft substantially parallel to each other;
a first arm structure and a second arm structure rotatably coupled with the first rotary shaft and the second rotary shaft, respectively; and
a guide member connected with the rotary shaft assembly and including a recessed area located substantially between the first rotary shaft and the second rotary shaft when viewed from above the flexible display, the recessed area configured to accommodate at least part of the third display portion when the foldable housing is at least partially folded,
wherein the flexible display includes a display panel and a support plate attached to a rear surface of the display panel,
wherein at least part of the support plate is accommodated in the recessed area when the foldable housing is at least partially folded,
wherein the support plate includes a bending portion where is bendable when the foldable housing is at least partially folded,
wherein the bending portion is formed supports at least part of the third display portion in an unfolded state in which the third display portion forms a flat surface, and
wherein the bending portion is partially received in the recessed area while being spaced apart from the third display portion in a folded state in which the third display portion forms a curved surface.

2. The portable communication device of claim 1, wherein the at least part of the support plate accommodated in the recessed area is formed as a lattice portion.

3. The portable communication device of claim 1, wherein the guide member includes a first planar area extending from a first edge of the recessed area in a first direction substantially perpendicular to the first axis toward the first display portion, and a second planar area extending from a second edge of the recessed area opposite to the first edge in a second direction opposite to the first direction toward the second display portion, and wherein the flexible display is supported by the first and second planar areas without the at least part of the third display portion being accommodated in the recessed area when the foldable housing is unfolded.

4. The portable communication device of claim 1, wherein the hinge structure includes:
 a first bracket structure connected with the first arm structure and supporting the first display portion; and
 a second bracket structure connected with the second arm structure and supporting the second display portion.

5. The portable communication device of claim 1, wherein the guide member includes a first opening and a second opening formed therein, and wherein the first rotary shaft and the second rotary shaft are connected via the first opening and the second opening, respectively.

6. The portable communication device of claim 5, wherein the guide member includes a third opening and a fourth opening formed therein, and
 wherein the hinge structure includes:
 a first shaft gear disposed on the first rotary shaft;
 a second shaft gear disposed on the second rotary shaft;
 a first idle gear disposed between the first shaft gear and the second rotary shaft; and
 a second idle gear disposed between the first idle gear and the second rotary shaft,
 wherein the first idle gear disposed on a third shaft and the second idle gear disposed on a fourth shaft, and
 wherein the third shaft and the fourth shaft are connected via the third opening and the fourth opening, respectively.

7. The portable communication device of claim 1, wherein at least part of the bending portion is bent toward a folding axis of the display panel by being brought into contact with the recessed area when the portable communication device is changed from the unfolded state to the folded state.

8. The portable communication device of claim 1, wherein in the folded state, a distance by which the third display portion and the bending portion are spaced apart from each other increases toward a direction in which the recessed area is concavely formed.

9. The portable communication device of claim 1, wherein the bending portion is formed includes a plurality of slits formed through at least a partial area of the support plate.

10. The portable communication device of claim 9, wherein the plurality of slits includes at least one of a first slit discontinuously formed along a lengthwise direction of the bending portion or a second slit continuously formed along the lengthwise direction of the bending portion.

11. The portable communication device of claim 1, wherein the bending portion is formed partially contains a flexible material.

12. The portable communication device of claim 1, further comprising:
 an adhesive member disposed between the display panel and at least a portion of the support plate.

13. The portable communication device of claim 1, further comprising:
 a reinforcing member disposed between the display panel and the bending portion.

14. The portable communication device of claim 1, wherein the hinge structure includes:
 a hinge module including a first hinge module and a second hinge module disposed to face each other in a direction of a folding axis of the display panel.

15. The portable communication device of claim 14, wherein the guide member is disposed on at least one of the first hinge module or the second hinge module.

16. The portable communication device of claim 15, wherein the guide member includes a first guide member disposed on the first hinge module, a second guide member disposed on the second hinge module.

17. The portable communication device of claim 16, wherein at least part of the bending portion is supported by the first guide member and the second guide member or is supported by the second guide member when the first housing and the second housing are folded toward each other.

* * * * *